United States Patent
Jang et al.

(10) Patent No.: US 10,217,477 B2
(45) Date of Patent: Feb. 26, 2019

(54) ELECTRONIC DEVICE AND SPEECH RECOGNITION METHOD THEREOF

(71) Applicant: Samsung Electronics Co., Ltd., Suwon-si, Gyeonggi-do (KR)

(72) Inventors: Sungwoon Jang, Hwaseong-si (KR); Sangwook Shin, Seoul (KR); Sungwan Youn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/338,905

(22) Filed: Oct. 31, 2016

(65) Prior Publication Data

US 2017/0213569 A1 Jul. 27, 2017

(30) Foreign Application Priority Data

Jan. 26, 2016 (KR) .................. 10-2016-0009248

(51) Int. Cl.
*G10L 25/87* (2013.01)
*G10L 15/04* (2013.01)

(52) U.S. Cl.
CPC .............. *G10L 25/87* (2013.01); *G10L 15/04* (2013.01)

(58) Field of Classification Search
USPC ........................................................ 704/232
See application file for complete search history.

(56) References Cited

U.S. PATENT DOCUMENTS

| 4,052,568 A | * | 10/1977 | Jankowski | .............. G10L 25/78 704/233 |
| 4,167,653 A | | 9/1979 | Araseki et al. | |
| 9,437,186 B1 | * | 9/2016 | Liu | .......... G10L 15/05 |

(Continued)

FOREIGN PATENT DOCUMENTS

| JP | 2009-175179 A | 8/2009 |
| KR | 10-0819848 B1 | 4/2008 |
| WO | 2017/003903 A1 | 1/2017 |

OTHER PUBLICATIONS

Baiyang Liu et al: "Accurate Endpointing with Expected Pause Duration", Sep. 6, 2015, XP055302307, Retrieved from the Internet: URL: http://www.isca-speech.org/archive/interspeech_2015/papers/i15_2912.pdf [retrieved on Sep. 13, 2016].

(Continued)

*Primary Examiner* — Abul K Azad
(74) *Attorney, Agent, or Firm* — Jefferson IP Law, LLP

(57) ABSTRACT

An electronic device and a speech recognition method that is capable of adjusting an end-of-utterance detection period dynamically are disclosed. The electronic device includes a microphone, a display, an input device formed as a part of the display or connected to the electronic device as a separate device, a processor electrically connected to the microphone, the display, and the input device, and a memory electrically connected to the processor. The memory stores instructions, executable by the processor, for receiving an utterance input by a user through the microphone, converting the utterance to text comprised of a series of words or phrases with spaces, displaying the text on the display, the text comprising at least one space formed at an incorrect position, and receiving a user input for updating a predetermined time period through the input device.

14 Claims, 18 Drawing Sheets

(56) References Cited

U.S. PATENT DOCUMENTS

| | | | |
|---|---|---|---|
| 2002/0184017 A1* | 12/2002 | Lee | G10L 25/87 |
| | | | 704/236 |
| 2004/0121812 A1 | 6/2004 | Doran et al. | |
| 2005/0055201 A1* | 3/2005 | Florencio | G10L 25/87 |
| | | | 704/214 |
| 2005/0131689 A1* | 6/2005 | Garner | G10L 25/78 |
| | | | 704/240 |
| 2008/0040109 A1 | 2/2008 | Muralidhar et al. | |
| 2010/0180202 A1* | 7/2010 | Del Valle Lopez | G06F 3/048 |
| | | | 715/728 |
| 2014/0019127 A1 | 1/2014 | Park et al. | |
| 2015/0142430 A1 | 5/2015 | Kwon | |
| 2016/0379632 A1* | 12/2016 | Hoffmeister | G10L 15/18 |
| | | | 704/253 |
| 2017/0110116 A1* | 4/2017 | Tadpatrikar | G10L 15/05 |

OTHER PUBLICATIONS

EP Search Report dated Dec. 17, 2018 issued in EP Application 16888298.3.

* cited by examiner

FIG. 15
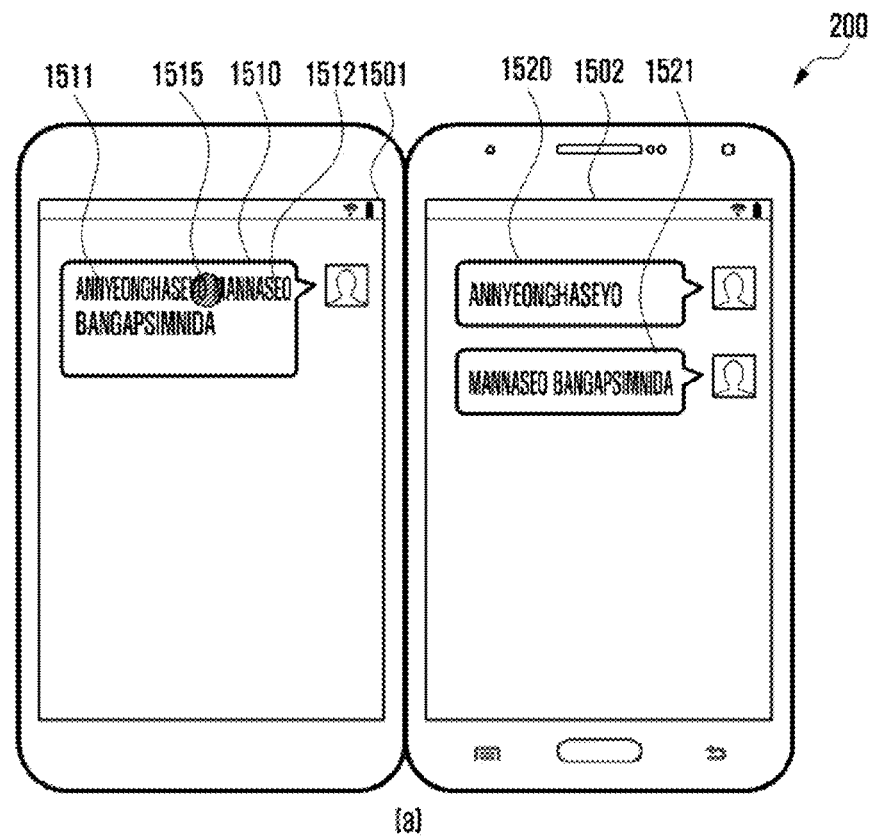
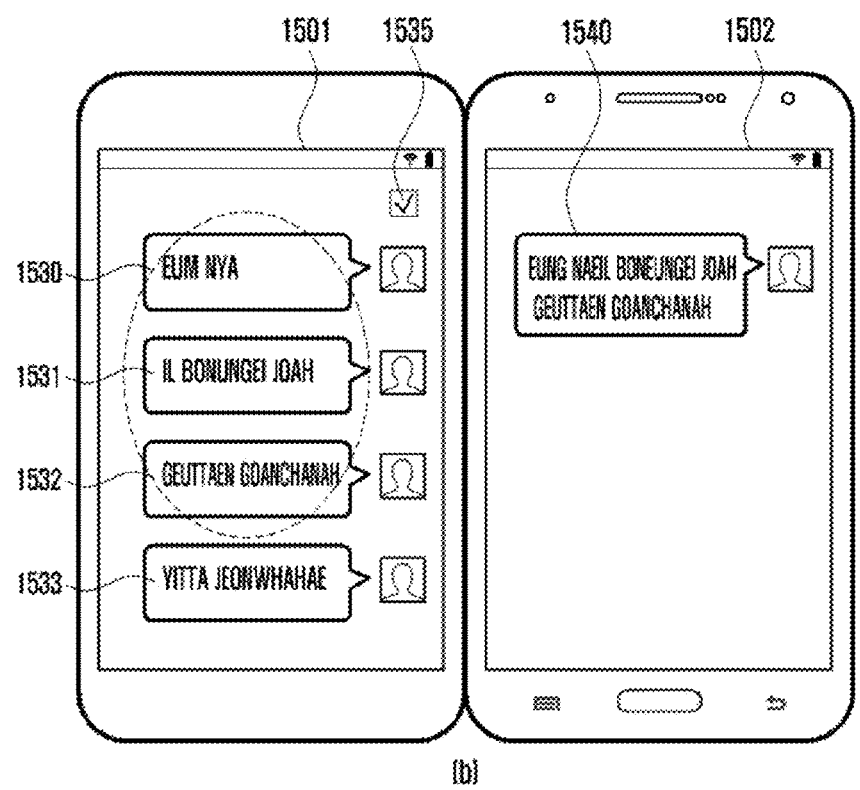

ELECTRONIC DEVICE AND SPEECH RECOGNITION METHOD THEREOF

CROSS-REFERENCE TO RELATED APPLICATION(S)

This application claims the benefit under 35 U.S.C. § 119(a) of a Korean patent application filed on Jan. 26, 2016 in the Korean Intellectual Property Office and assigned Serial number 10-2016-0009248, the entire disclosure of which is hereby incorporated by reference.

TECHNICAL FIELD

The present disclosure relates to an electronic device and speech recognition method thereof. More particularly, the present disclosure relates to an electronic device and speech recognition method that is capable of adjusting an utterance end detection period dynamically.

BACKGROUND

With the advance of hardware and communication technologies, electronic devices are equipped with various functions that meet the demands of users in various fields. Typically, a speech recognition technology can be implemented in various electronic devices equipped with a speech input device (e.g., microphone). Meanwhile, speech recognition is becoming popular as an alternative input technology that replaces physical input mechanisms for controlling electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and speech recognition method thereof. In the case that the time period for detecting the end of a user's utterance is fixed, the accuracy of speech recognition may decrease. For example, if the utterance end detection period is too short, the electronic device may fail to recognize a certain complete sentence and just recognize a series of words. Meanwhile, if the utterance end detection period is too long, this makes an utterance unit unclear and retards output of a recognition result, which results in degradation of usability.

In accordance with an aspect of the present disclosure, an electronic device is provided. The electronic device includes a microphone, a display, a processor electrically connected to the microphone and the display, and a memory electrically connected to the processor, wherein the memory stores commands, executable by the processor, for recognizing speech input through the microphone and updating a predetermined speech end detection period to a pause period between a speech stop time point and a speech resume time point.

In accordance with another aspect of the present disclosure, a speech recognition method of an electronic device is provided. The speech recognition method includes recognizing speech input and updating a predetermined speech end detection period to a pause period between a speech stop time point and a speech resume time point.

In accordance with another aspect of the present disclosure, a non-transitory computer-readable recording medium having recorded thereon at least one program comprising commands, which when executed by a processor, performs a speech recognition method is provided. The speech recognition method includes recognizing speech input, and updating a predetermined speech end detection period to a pause period between a speech stop time point and a speech resume time point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 is a diagram illustrating screen displays of an electronic device for explaining an operation of splitting a sentence into phrases and merging phrases into a sentence according to an embodiment of the present disclosure;

Throughout the drawings, like reference numerals will be understood to refer to like parts, components, and structures.

Figure 1:
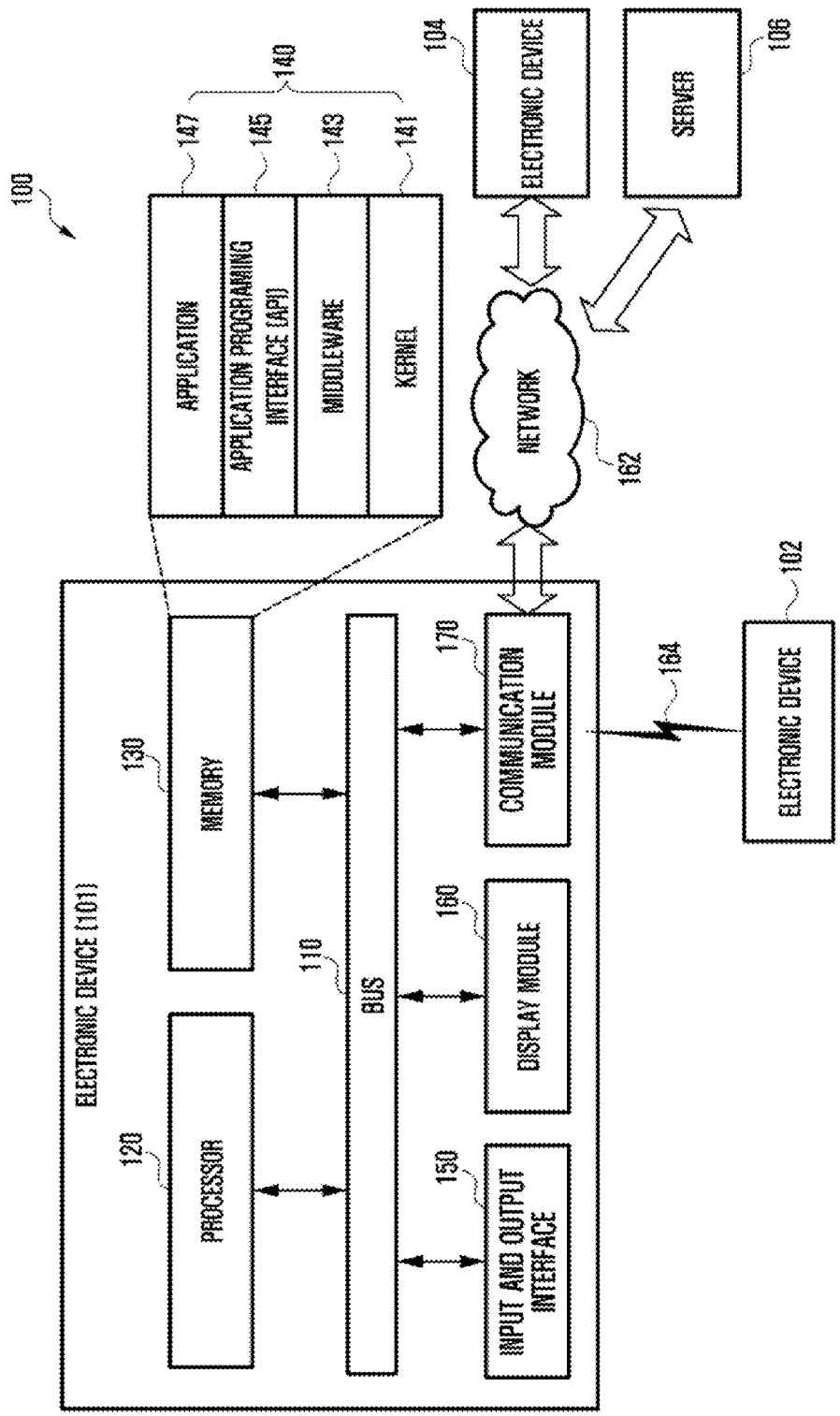
FIG. 1 is a diagram illustrating a network structure including electronic devices according to various embodiments of the present disclosure.

In aforementioned embodiments, the electronic device can improve speech recognition performance by changing speech end detection period according to user habit of speech.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

"Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, operations, elements, and/or components, but do not preclude the presence or addition of one or more other features, regions, integers, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player), a Moving Picture Experts Group (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (MRA), MR imaging (MRI), computed tomography (CT), ultrasonography, etc.), a navigation device, a global positioning system (GPS) receiver, an event data recorder (EDR), a flight DR (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are not to be considered as a limitation of this disclosure. Various speech presented in the embodiments of the present disclosure may be in the Korean language (in Romanized text), simply as examples and are not limited thereto. Other languages can be utilized as well.

FIG. 1 is a block diagram illustrating a network environment 100 including therein an electronic device 101 in accordance with an embodiment of the present disclosure.

Referring to FIG. 1, the electronic device 101 may include, but is not limited to, a bus 110, a processor 120, a memory 130, an input/output interface 150, a display or display module 160, a communication interface 170, and an application control module 140.

The bus 110 may be a circuit designed for connecting the above-discussed elements and communicating data (e.g., a control message) between such elements.

The processor 120 may receive commands from the other elements (e.g., the memory 130, the input/output interface 150, the display 160, the communication interface 170, or the application control module 140, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, the communication interface 170, or the application control module 140, etc.). The memory 130 may include programming modules such as a kernel 141, a middleware 143, an application programming interface (API) 145, and an application 147. Each of the programming modules may be implemented in software, firmware, hardware, and any combination thereof.

The kernel 141 may control or manage system resources (e.g., the bus 110, the processor 120, or the memory 130, etc.) used for performing operations or functions of the other programming modules, e.g., the middleware 143, the API 145, or the application 147. Additionally, the kernel 141 may offer an interface that allows the middleware 143, the API 145 or the application 147 to access, control or manage individual elements of the electronic device 101.

The middleware 143 may perform intermediation by which the API 145 or the application 147 communicates with the kernel 141 to transmit or receive data. Additionally, in connection with task requests received from the applications 147, the middleware 143 may perform a control (e.g., scheduling or load balancing) for the task request by using technique such as assigning the priority for using a system resource of the electronic device 101 (e.g., the bus 110, the processor 120, or the memory 130, etc.) to at least one of the applications 147.

The API 145 which is an interface for allowing the application 147 to control a function provided by the kernel 141 or the middleware 143 may include, for example, at least one interface or function (e.g., a command) for a file control, a window control, an image processing, a text control, and the like.

According to various embodiments, the application 147 may include a short message service (SMS)/multimedia messaging service (MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 147 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to various embodiments, the application 147 may include a specific application specified depending on attributes (e.g., a type) of an external electronic device (e.g., the electronic device 104). For example, in case an external electronic device is an MP3 player, the application 147 may include a specific application associated with a play of music. Similarly, in case an external electronic device is a portable medical device, the application 147 may include a specific application associated with a health care. In an embodiment, the application 147 may include at least one of an application assigned to the electronic device 101 or an application received from an external electronic device (e.g., the server 106 or the electronic device 104).

The input/output interface 150 may deliver commands or data, entered by a user through an input/output unit (e.g., a sensor, a keyboard, or a touch screen), to the processor 120, the memory 130, the communication interface 170, or the application control module 140 via the bus 110. For example, the input/output interface 150 may offer data about a user's touch, entered through the touch screen, to the processor 120. Also, through the input/output unit (e.g., a speaker or a display), the input/output interface 150 may output commands or data, received from the processor 120, the memory 130, the communication interface 170, or the application control module 140 via the bus 110. For example, the input/output interface 150 may output voice data, processed through the processor 120, to a user through the speaker.

The display 160 may contain liquid crystal display (LCD), light emitting diode (LED), organic LED (OLED), microelectromechanical systems (MEMS) display, and electronic paper display. The display 160 may display thereon various kinds of information (e.g., multimedia data, text data, etc.) to a user. The display 160 may contain touch screen and, for example, the display 160 may receive touch using electronic pen or a portion of the user's body, gesture, and hovering input.

Figure 2:
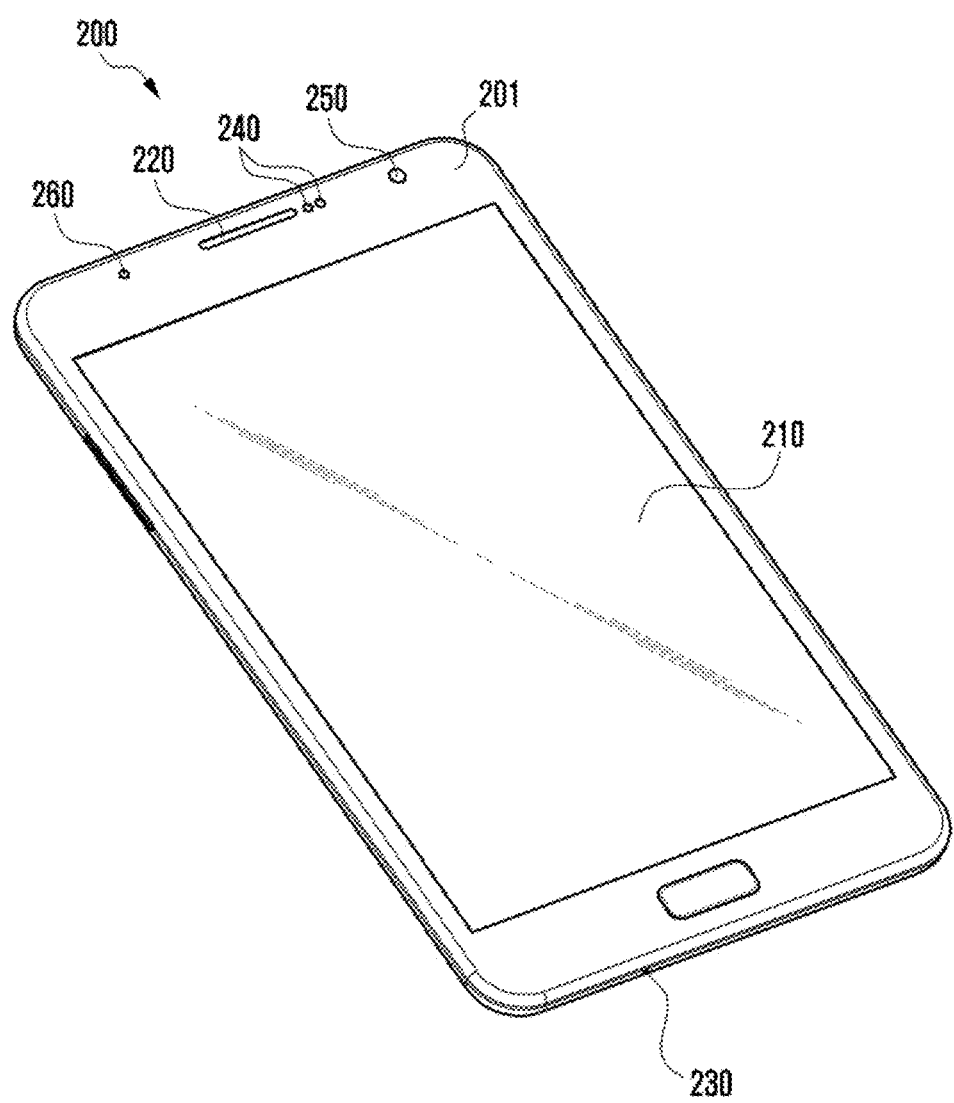
FIG. 2 is a perspective view illustrating an electronic device 200 according to various embodiments of the present disclosure.

In various embodiments, the display 160 may output location information determined by at least one of the processor 120, the application processor (AP) 210, and the global navigation satellite system (GNSS) module 227 (shown in FIG. 2). The display 160 may also output information received by the electronic device 101 from one or more satellites. The display 160 may output a user interface (UI) screen for setting the location identification period, generate an input signal corresponding to user input for setting the location identification period, and forward the input signal to at least one of the processor 120, the AP 210 (shown in FIG. 2), and the GNSS module 227.

The communication interface 170 may perform a communication between the electronic device 101 and any external electronic device (e.g., the electronic device 104 of the server 106). For example, the communication interface 170 may communicate with any external device by being connected with a network 162 through a wired or wireless communication. A wireless communication 164 to an electronic device 102 for example may include, but not limited to, at least one of wireless fidelity (Wi-Fi), Bluetooth (BT), NFC near field communication (NFC), global positioning system (GPS), or a cellular communication (e.g., long-term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM), etc.). A wired communication may include, but not limited to, at least one of universal serial bus (USB), high definition multimedia interface (HDMI), recommended standard 232 (RS 232), or plain old telephone service (POTS).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 147, the API 145, the middleware 143, the kernel 141, or the communication interface 170.

The application control module 140 may process at least part of information obtained from the other elements (e.g., the processor 120, the memory 130, the input/output interface 150, or the communication interface 170, etc.) and then offer it to a user in various ways. For example, the application control module 140 may recognize information about access components equipped in the electronic device 101, store such information in the memory 130, and execute the application 147 on the basis of such information.

FIG. 2 is a perspective view illustrating an electronic device 200 according to various embodiments of the present disclosure. The electronic device 101 shown in FIG. 1 may include the electronic device 200 shown in FIG. 2.

Referring to FIG. 2, the electronic device 200 may be implemented as any of various purpose-specific devices. Examples of the electronic device 200 include, but are not limited to, a mobile phone, a smartphone, a laptop computer, a tablet device, an electronic book device, a digital broadcast device, a personal digital assistant (PDA), a portable multimedia player (PMP), a navigator, and a wearable device such as a smart watch, smart glasses, and a head-mounted display (HMD).

With reference to FIG. 2, the electronic device 200 may include a display 210 formed on its front side. The electronic device 200 may include a speaker 220 formed above the display 210 on its front side for outputting sounds including speech of a counterpart. The electronic device 200 may also include a microphone 230 formed below the display 210 on its front side for receiving the user's speech to be transferred to the counterpart.

According to an embodiment of the present disclosure, the electronic device 200 may include other components responsible for various functions of the electronic device 200. The components may include at least one sensor module 240. The sensor module 240 may include at least one of a luminance sensor (e.g., optical sensor), a proximity sensor, an infrared sensor, and a microwave sensor. According to an embodiment of the present disclosure, the electronic device 200 may include a light emitting diode (LED) indicator 260 to present the state of the electronic device 200 to the user. The electronic device 200 may include a flash 250 to provide needed lighting taking photographs or movie clips.

The electronic device 200 may receive user's utterance through the microphone 230 and perform speech recognition on the user's utterance. The speech recognition is a process for the electronic device 200 to map an audio signal to text.

For example, the electronic device 200 may convert the audio signal received through the microphone 230 to a word, a set of words, or a sentence and may use the recognition result as a final instruction such as a command, a control, data input, or document preparation. In the speech recognition process, the electronic device 200 may transmit the speech input through the microphone 230 to an external electronic device 104 or a server to receive a speech recognition result therefrom. The speech recognition process is described in detail hereinafter.

Figure 3:
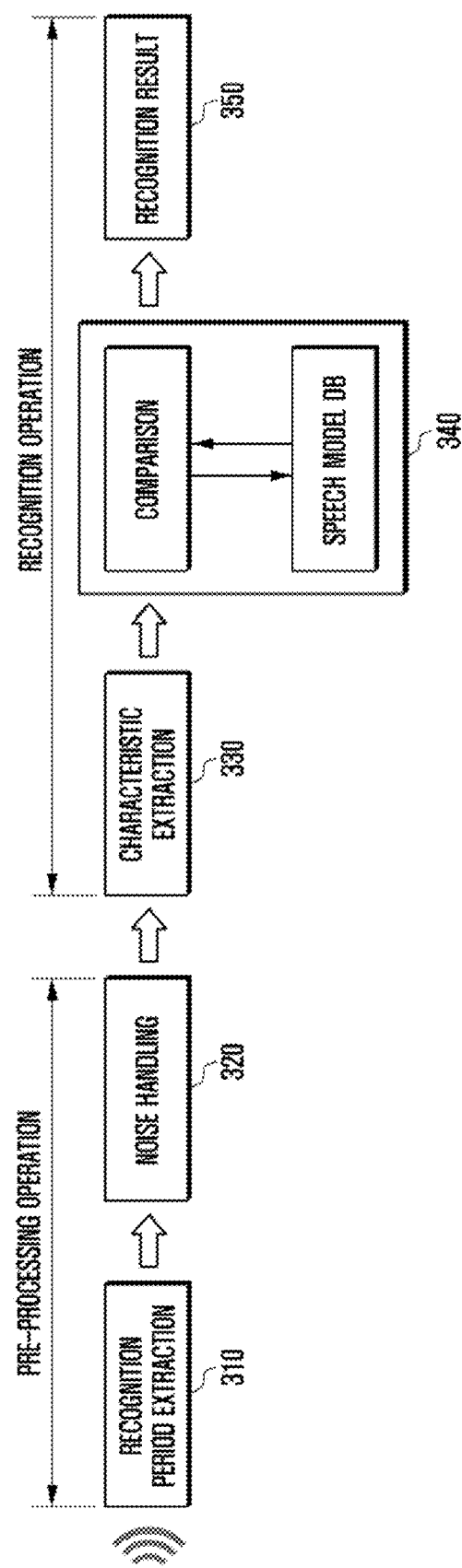
FIG. 3 is a block diagram illustrating a speech recognition mechanism according to an embodiment of the present disclosure.

FIG. 3 is a block diagram illustrating a speech recognition mechanism according to an embodiment of the present disclosure.

Using the speech recognition technology, the electronic device 200 may analyze the user's speech, extract features, measure similarity to the speech models stored in a database (DB), and convert the most similar speech model to text or a command. The speech recognition is a so-called pattern recognition process for collecting speech data from persons (as many as possible) who have different voice tones and accents and extracting common features from the collected speech data to generate reference patterns.

Referring to FIG. 3, the speech recognition process may be divided into two operations: a pre-process operation and a recognition operation. The electronic device 200 (shown in FIG. 2) may receive speech (utterance) of the user by means of a microphone (e.g., the microphone 230 shown in FIG. 2). The electronic device 200 may extract a speech recognition period for analyzing the received speech as denoted by reference number 310. The user's speech may include meaningless sound such as ambient noise. Accordingly, the electronic device 200 may perform a noise handling process during the speech recognition period as denoted by reference number 320. The pre-process operation has been described previously.

The electronic device 200 may analyze the noise removed speech through the pre-processing operation to extract features for speech recognition as denoted by reference number 330. The electronic device may compare the input speech with the speech models stored in the speech database to output a most promising candidate word as a speech recognition result as denoted by reference number 340. In the case of operating in a dictation mode other than a voice command mode, it is possible to improve the speech recognition performance using a speech recognition method such as a connected word recognition, a continuous speech recognition, and a conversational speech recognition method. It may also be possible to collect regularities of linguistic patterns in the real speech environment to use them in the speech recognition models capable of improving speech recognition accuracy.

The electronic device 200 may perform predetermined operations by reflecting the recognition result as denoted by reference number 350. The electronic device 200 may also notify the user of the recognition result in sound or by displaying a notice on the display 210.

In the speech recognition method described above, it may be necessary to determine when the user's utterance ends to improve the accuracy of the speech recognition result. This is because the start and end points of the utterance may delimit a sentence. A method for detecting a start and an end of an utterance is described hereinafter.

Figure 4:
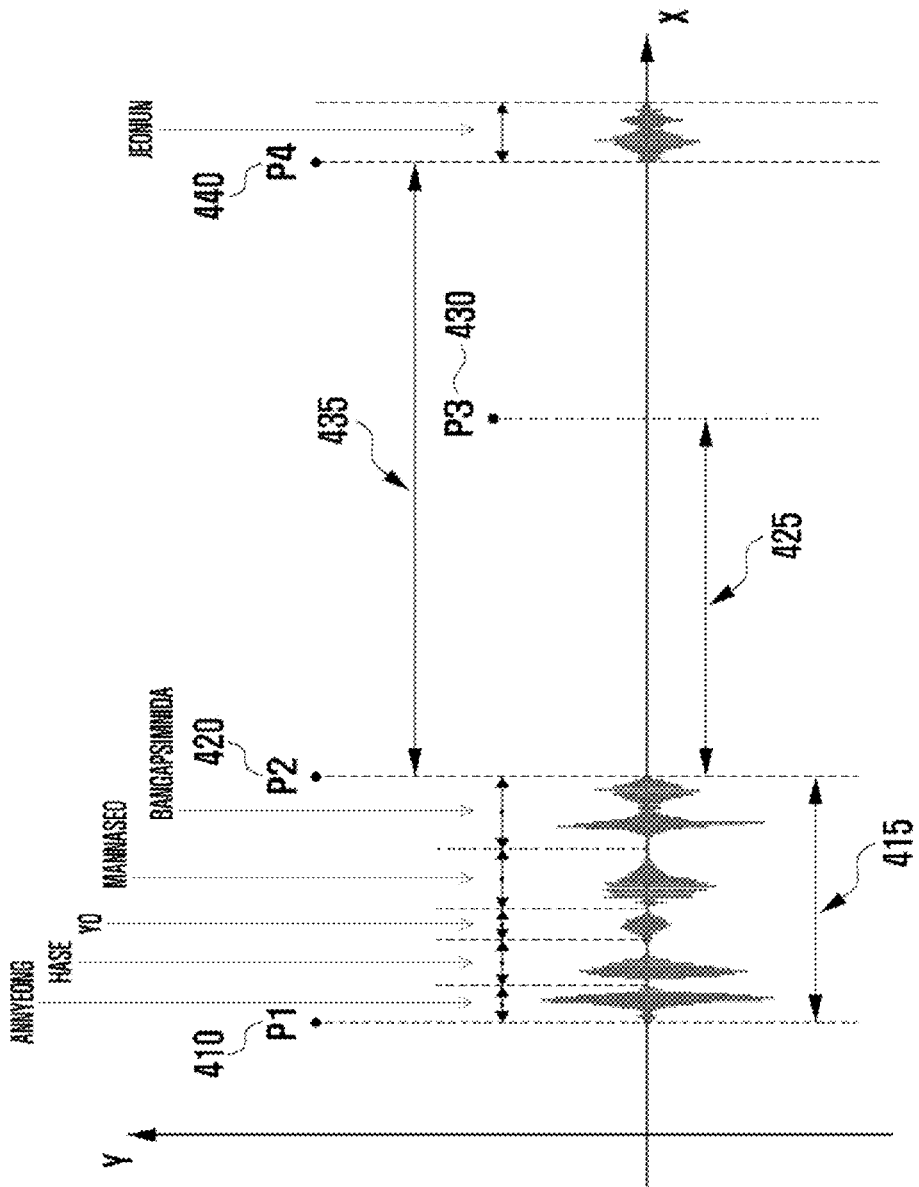
FIG. 4 is a diagram illustrating a graph of a waveform for detecting the end of an utterance in a speech recognition algorithm according to an embodiment of the present disclosure.

FIG. 4 is a diagram illustrating a graph of a waveform for detecting the end of an utterance in a speech recognition algorithm according to an embodiment of the present disclosure. The speech recognition algorithm may be installed in the electronic device 200 or in an external electronic device or a server.

Referring to FIG. 4, FIG. 4 shows a graph of an analog speech signal. In the graph, the x axis denotes time, and the y axis denotes magnitude of the speech signal. As noted, various speech presented in the embodiments of the present disclosure may be in the Korean language (in Romanized text), simply as examples and are not limited thereto. Other languages can be utilized as well.

The speech recognition algorithm may generate a waveform graph representing speech "Annyeonghaseyo. Mannaseo bangapsimnida" (which may be translated as "Greetings. Happy to meet you"). In the graph, the words "annyeong", "hase", "yo", "mannaseo", and "bangapsimnida." have different magnitudes on the y axis. The speech recognition algorithm detects that the magnitude of the waveform is greater than a predetermined threshold at the start point P1 410 of the word "annyeong" and determines that speech input has started.

The speech recognition algorithm may also detect that the magnitude of the waveform is greater than the predetermined threshold at words "hase", "yo", "mannaseo", and "bangapsimnida" and thus determine that the speech is in progress. Although there are sections in which the magnitude of the waveform is less than the predetermined threshold between the words, they are short and followed immediately by another word having the waveform magnitude greater than the predetermined threshold; thus, the speech recognition algorithm determines that the speech continues until the time point P2 420. Such a period during which the magnitude of the speech waveform is greater than the threshold level, as denoted by reference number 415, is referred to as a "speech period".

The speech recognition algorithm may detect that the magnitude of the waveform is less the threshold level until the time point P4 440, when the word "Jeonun" (which may be translated as "I" in the first person) is input after the utterance of the word "bangapsimnida". Such a period during which the magnitude of the speech waveform is less than the threshold level, as denoted by reference number 435, is referred to as a "pause period".

Although the speech recognition algorithm detects suspension of the speech at the time point P2 420, it does not regard this speech suspension as the end of the utterance because there are periods during which the magnitude of the waveform is less than the threshold level even between the words as described above. Accordingly, there is a need for the algorithm to determine with certainty the end of the speech.

According to various embodiments of the present disclosure, the speech recognition algorithm may set a time period starting from the end of speech and determine whether the speech has ended during the period. This period set for use in determining whether the utterance has ended is referred to as an "END POINT DETECTION (EPD) period" 425.

The EPD period 425 may be set to a predetermined length starting at the time point when the magnitude of the speech waveform is equal to or less than the predetermined level. The EPD period 425 may be set by the manufacturer of the electronic device 200 at the manufacturing state or by the user arbitrarily. It may be possible for the EPD period 425 to be shorter than the pause period 435. If no speech input is detected during the EPD period 425 that has a waveform magnitude higher than the threshold level, the speech recognition algorithm determines that the speech input has ended.

The EPD period 425 may be configured to optimize speech recognition. For example, if the EPD period is too short, the speech recognition algorithm may recognize syllables as a meaningless series rather than a complete sentence, resulting in a failure of speech recognition. Also, if the EPD period 425 is too long, the speech recognition algorithm may not delimit a user's utterances by sentence correctly, which may retard the output of the speech recognition result and thereby degrade usability.

It is possible to improve the accuracy of speech recognition by setting the EPD period appropriately. If the manufacturer of the electronic device 200 sets the EPD period 425 collectively, it may be difficult to suit the utterance patterns of an individual user. There may be various methods for setting the EPD period 425 to adapt to a user's utterance patterns and improve the speech recognition performance.

A description is made of a method for improving accuracy of the detection of utterance end time by adjusting the EPD period 425 based on the pause period 435 during a user's utterance. Time point P3 430 is an end of the EPD period 425, as shown in FIG. 4.

Figure 5:
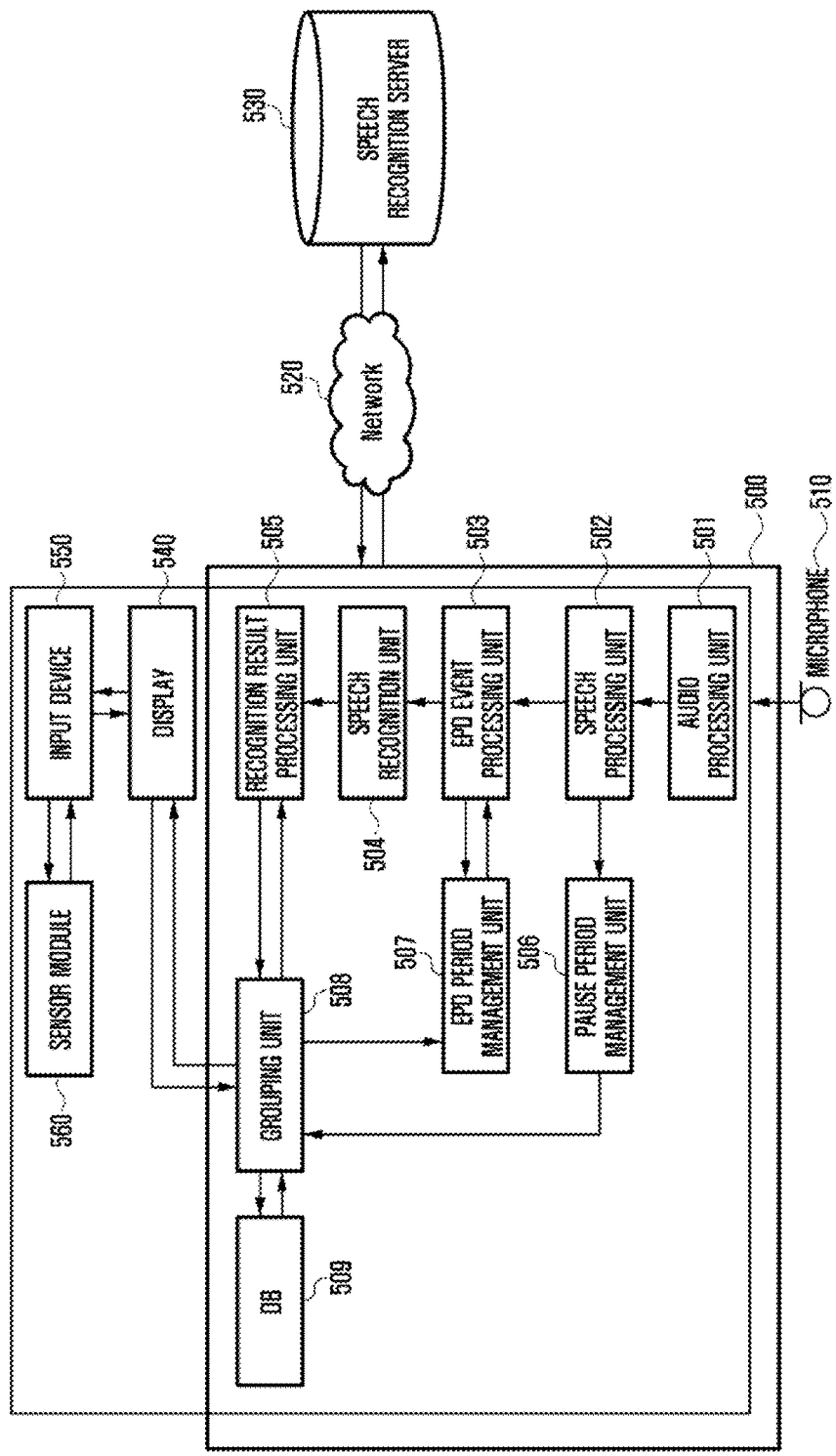
FIG. 5 is a block diagram illustrating a mechanism for an electronic device to extract a pause period during a user's utterance and manage the pause period in the form of a database according to an embodiment of the present disclosure.

FIG. 5 is a block diagram illustrating a mechanism for an electronic device to extract a pause period during a user's utterance and managing the pause period in the form of a database according to an embodiment of the present disclosure.

Referring to FIG. 5, the electronic device 200 shown in FIG. 2 may receive a user's utterance through the microphone 510. The input speech may be processed by the processor 500. The processor 120 shown in FIG. 1 may include the processor 500 shown in FIG. 5. The input speech may also be processed by a separate audio module. In the following description, it is assumed that the processor 500 processes speeches.

The audio processing unit 501 may process the user's utterance input through the microphone 510. The audio processing unit 501 may convert an analog speech signal to a digital signal and perform a pre-processing operation such as noise cancelling on the digital signal to output the speech signal with the quality suitable for speech recognition to a speech recognition system.

The audio processing unit 502 may determine whether the magnitude of the speech signal is greater than a predetermined level. The audio processing unit 502 may detect a start point and an end point of a meaningful utterance according to the determination result.

The pause period management unit 506 may measure the duration between the end point of the utterance and the start point of the next utterance detected by the speech processing unit 502, i.e., the pause period. The pause period management unit 506 may designate a period between a point when a voice of which the strength is equal to or greater than a predetermined level starts and a point when another voice of which the strength is less than the predetermined level starts. The pause period management unit 506 may map the measured pause period to the designated speech and manage the mapping.

According to an embodiment of the present disclosure, the electronic device 200 may adjust the EPD period to be suitable for speech recognition according to the user's utterance pattern. That is, the pause period management unit 506 may use one of the pause period values mapped to the respective voices as the EPD period of the electronic device 200 (shown in FIG. 2).

The EPD event processing unit 503 may monitor the speech input for the period during which the magnitude of the speech is less than the predetermined level. The EPD event processing unit 503 may detect an EPD event concerning utterance completion upon the end of a certain EPD period stored in the EPD period management unit 507 and transfer the EPD event to the speech recognition unit 504.

The EPD period management unit 507 may manage the currently configured EPD period. The EPD period may be set by the manufacturer of the electronic device 200 at the manufacturing stage and may be adjusted by the user. According to an embodiment of the present disclosure, the EPD period management unit 507 may update the current EPD period to a specific pause period set by the user.

The speech recognition unit 504 may compress the input speech with a predetermined codec. The compressed data may be transmitted to the speech recognition server 530 on the network 520 via a communication interface. The speech recognition server 530 may be a separate external device. According to an embodiment, the speech recognition server 530 may be a component of the electronic device 200. The speech recognition unit 504 may receive a speech recognition result from the speech recognition server 530 and deliver the speech recognition result to the recognition result processing unit 505.

The speech recognition unit 504 may transmit to the speech recognition server 530 a whole speech file in real time and EPD period information separately. According to an embodiment, the speech recognition unit 504 may transmit the input speech to the speech recognition server 530 in adaptation to the EPD period.

The recognition result processing unit 505 may arrange the speech recognition result per utterance based on the speech recognition result and utterance time information from the speech recognition unit 504 and manage the speech recognition results per session. That is, one session may include the speech and speech recognition result.

The grouping unit 508 may perform grouping by combining the per-speech pause period information managed by the pause period management unit 506 and the sessions established by the recognition result processing unit 505. That is, the grouping unit 508 may include the pause period of the speech measured by the speech processing unit 502 in the session having the speech and speech recognition result. With reference to the embodiment shown in FIG. 4, the grouping unit 508 may include the pause period 425 appearing after "Annyeonghaseyo. Mannaseo bangapsimnida" in the session including the speech and the speech recognition result. Accordingly, a session may be managed in the form of a data package including speech, a speech recognition result, and a pause period following the speech.

The electronic device 200 may use the speech recognition result for re-recognition of the speech. The electronic device 200 may also use the per-speech pause period when the EPD period management unit 507 changes the EPD period.

The speech recognition result and the pause period included in the session may be shown on the display 540. The per-speech sessions established by the grouping unit 508 are stored in the database (DB) 509 in order to be used by the grouping unit 508 whenever necessary. The DB 509 may be implemented outside the electronic device 200 or in the memory of the electronic device 200 for storing the per-speech sessions.

The input device 550 may receive a user's action such as a touch input, a hard key input, and a gesture input. The user may check the speech recognition result displayed on the display 540 intuitively and split or merge the sentences or words selectively. The user's gesture input for splitting or merging the sentences or words displayed on the display 540 may be an input for changing the EPD period of the electronic device 200.

For example, if the user touches and drags to merge two sentences or words recognized and displayed separately by the electronic device 200, the EPD period may be updated to the time period including the longest one between the pause periods of the two sentences or two words. If the user touches and drags to split into two a sentence or a word recognized and displayed by the electronic device 200, the EPD period may be updated to one of the pause periods of the split sentences or words. The input device 550 may split or merge the sentences or words displayed on the display 540 using the data received from the sensor module 560. For example, it may be possible to use a temperature sensor, a gyro sensor, an acceleration sensor, a fingerprint sensor, and a proximity sensor.

According to an embodiment of the present disclosure, the electronic device 200 may map a speech recognition result to a pause period to establish a session and manage the session in a database. A description is made of the method for establishing a session.

According to various embodiments of the present disclosure, the electronic device may include a microphone, a display, a processor electrically connected to the microphone and display, and a memory electrically connected to the processor; the memory may store commands, executable by the processor, to recognize speech input through the microphone and change the pause period between the time point when the speech input ends and the time point when a next speech input starts for a predetermined speech end detection period.

According to various embodiments of the present disclosure, the commands may include a command, executable by the processor, to pack the utterance, the speech recognition result, and the pause period and to store the package.

According to various embodiments of the present disclosure, the commands may include a command, executable by the processor, to determine, if speech is input through the microphone after changing the pause period for the predetermined speech end detection period, whether the speech input ends based on the changed speech end detection period.

According to various embodiments of the present disclosure, the commands may include a command, executable by the processor, for the processor to communicate with an external electronic device to recognize the speech.

According to various embodiments of the present disclosure, the electronic device may further include an input device implemented as a part of the display or separately; the commands may include a command, executable by the processor, to control the display to display the speech in the form of text as a series of words or phrases separated by spaces therebetween and to receive a command, input by the user through the input device, for changing the preconfigured speech end detection period.

According to various embodiments of the present disclosure, the commands may include a command, executable by the processor, to control the display to display an indicator indicating that the utterance has ended in at least one of the spaces along with text.

According to various embodiments of the present disclosure, the user input may be an input for selecting the series of words or phrases or spaces to split or merge the words or phrases.

According to various embodiments of the present disclosure, the commands may include a command, executable by the processor, to change, in the case of splitting the words or phrases, the pause period following at least one of the split words or phrases for updating the preconfigured speech end detection period.

According to various embodiments of the present disclosure the commands may include a command, executable by the processor, to change, in the case of merging the words or phrases, the longest one of the pause periods of the merged words or phrases for updating the speech end detection period.

According to various embodiments of the present disclosure, the electronic device may include a microphone; a display; a user input unit implemented as a part of the display or separately; a processor electrically connected to the microphone, the display, and the user input unit; and a memory electrically connected to the processor, wherein the memory may store commands, executable by the processor, to receive a series of words or phrases including spaces therebetween from the speaker through the microphone during a predetermined period, convert the speech into text by means of a speech recognition processor, display the text with at least one space placed at a wrong position on the display, and receive a user input for adjusting the predetermined time interval through the input unit.

According to various embodiments of the present disclosure, the commands may include a command, executable by the processor, to receive another speech through the microphone during the changed time interval and convert the speech to text by means of the speech recognition processor.

According to various embodiments of the present disclosure, the commands may include a command, executable by the processor, to display at least one indicator configured for use in changing the predetermined time interval.

Figure 6:
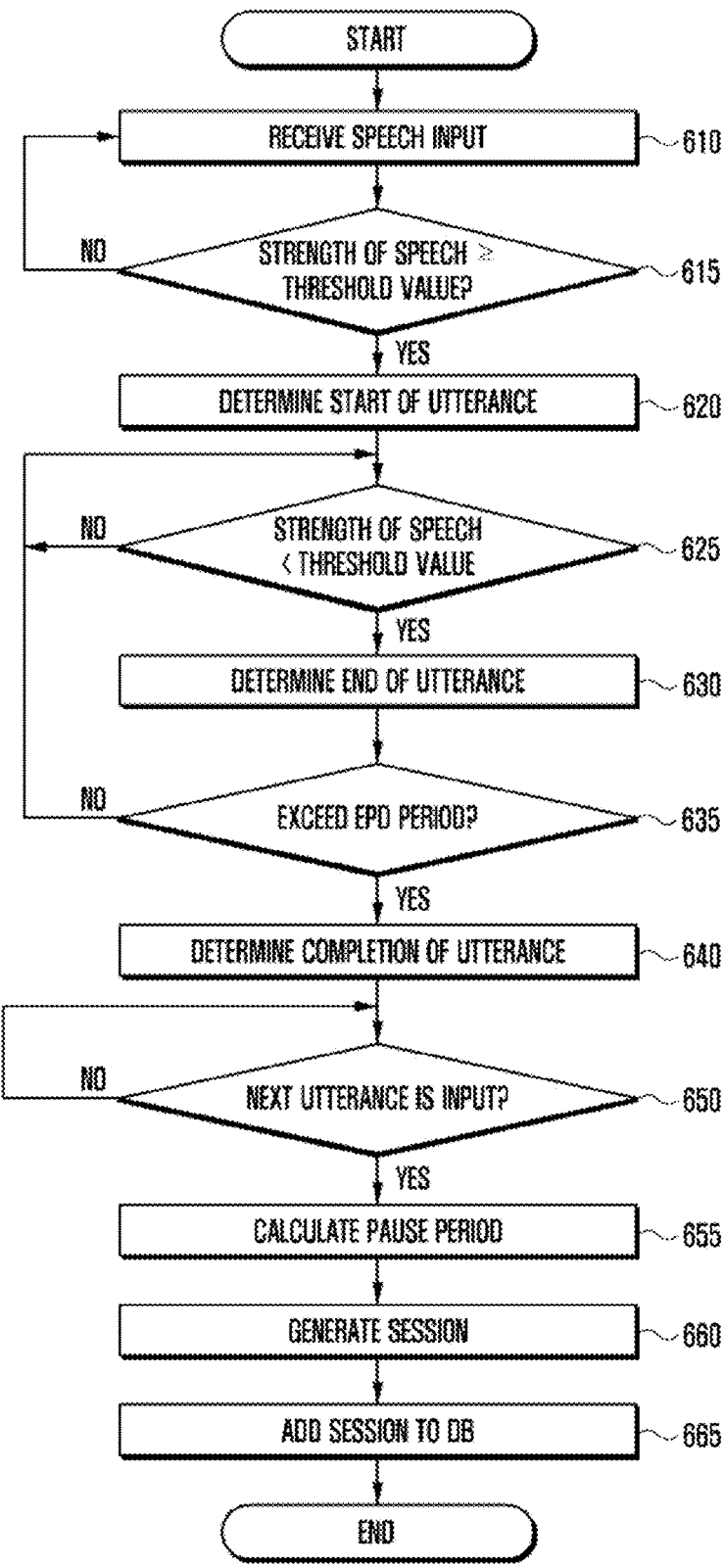
FIG. 6 is a flowchart illustrating a procedure of generating a session comprised of a speech, a speech recognition result, and a pause period according to an embodiment of the present disclosure.

FIG. 6 is a flowchart illustrating a procedure of generating a session comprised of an utterance, a speech recognition result, and a pause period according to an embodiment of the present disclosure.

Referring to FIG. 6, according to various embodiments of the present disclosure, the electronic device 200 may receive a user's speech through the microphone 230 at operation 610. The electronic device 200 determines at operation 615 whether the strength of the speech is equal to or greater than a predetermined level. If the strength of the speech is less than the predetermined level, the electronic device 200 may continue receiving speech, but otherwise, if the strength of the speech is equal to or greater than the predetermined level, the electronic device 200 determines that the user's utterance has started at operation 620.

According to various embodiments of the present disclosure, the electronic device 200 may continue monitoring for the strength of the speech after detecting the start of the user's utterance at operation 625. During the monitoring, the strength of the speech input may become less than the predetermined level. If the strength of the speech is less than the predetermined level, the electronic device 200 determines at operation 630 that the user's utterance has ended.

According to various embodiments of the present disclosure, if no speech is detected before the expiry of the EPD period, the electronic device 200 may determine at operation 625 whether the strength of the speech is less than the predetermined level. If the strength of the speech input is less than the predetermined level, the electronic device 200 may determine at operation 630 that the utterance has ended. Otherwise, if the strength of the speech input is equal to or greater than the predetermined level at operation 625, the electronic device 200 continues monitoring until the strength of the speech becomes less than the predetermined level. If the strength of the speech becomes less than the predetermined level, the electronic device may determine at operation 630 that the utterance has ended.

As described with reference to FIG. 4, if the electronic device 300 determines that the user's utterance has ended right after the strength of the speech becomes less than the predetermined level, this may cause a problem. According to various embodiments, the electronic device 200 may determine at operation 635 whether a predetermined time period elapses without further speech input after the suspension of the user's utterance. That is, the electronic device 200 determines whether no speech is input during a predetermined EPD period. If no speech input is detected during the EPD period, the electronic device 200 may determine at operation 640 that the user's utterance has been completed.

According to various embodiments of the present disclosure, the electronic device 200 continues monitoring to determine at operation 650 whether a new speech input is detected. If a new speech input is detected, the electronic device 200 may calculate the pause period between the user's utterances at operation 655. That is, the electronic device 200 may determine the pause period between the end time of speech input and the start time of the next speech input.

According to various embodiments of the present disclosure, the electronic device 200 may generate at operation 660 a session comprised of the input utterance, the speech recognition result, and the calculated pause period. In detail, the electronic device 200 may store the information on the time when the speech recognition result is output along with the speech recognition result. In this way, the electronic device 200 may manage the speech recognition result output time and pause period per speech. The electronic device 200 may add the sessions to the database (DB) at operation 665.

In this way, the electronic device 200 may store the speech recognition results and per-speech pause periods. The stored data may be displayed on the screen, and the EPD period of the electronic device 200 may be updated to the pause period in response to a user input. As the preconfigured EPD period is updated to the pause period in association with the user's utterance, the electronic device 200 may perform speech recognition with the EPD period adapted to the utterance pattern of the user.

Although the electronic device 200 may update the EPD period to the pause period in association with the user's utterance as described above, it may also be possible for the electronic device 200 to select one of the preconfigured EPD periods and the pause period detected during the user's utterance. For example, if a difference between the pause period extracted during the user's utterance and an average EPD period is equal to or longer than a predetermined value, the electronic device 200 may maintain the preconfigured EPD period. The average EPD period may be a time period preconfigured by the manufacturer based on the pause period data acquired from non-specific collected utterance data.

By using an EPD period adapted to the user's utterance pattern, it may be possible for the electronic device 200 to reduce the possibility of misrecognition caused by a too short EPD period, i.e., failure of recognizing a complete sentence and output of incomplete words. Also, by using an EPD period adapted to the user's utterance pattern, it may be possible to overcome the problems caused by a too long EPD period, i.e., unclear utterance units and a recognition result output delay that causes a degradation of usability.

Figure 7:
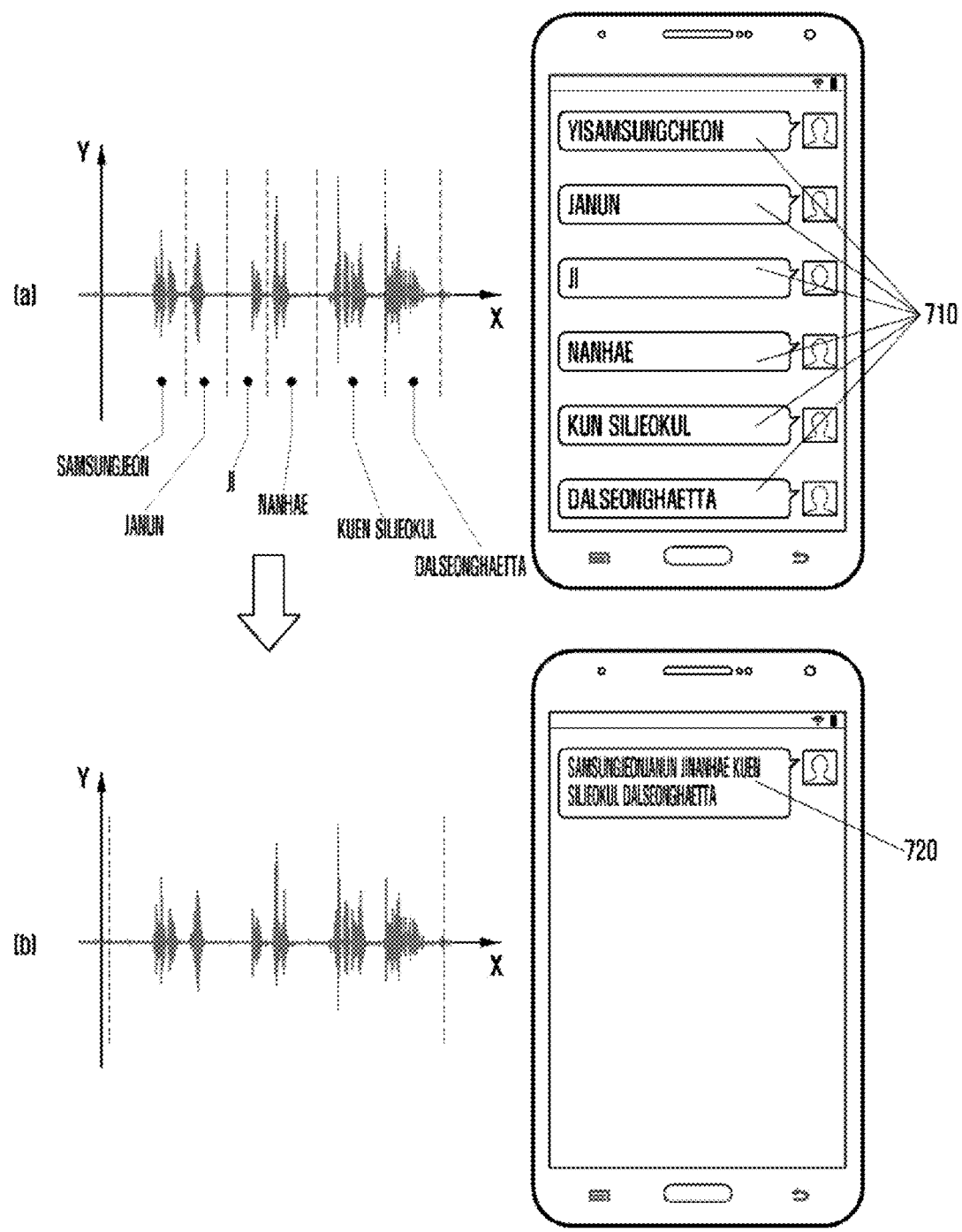
FIG. 7 is a diagram for explaining an operation for reducing misrecognition by adjusting the end point detection (EPD) period according to an embodiment of the present disclosure.

FIG. 7 is a diagram for explaining an operation for reducing misrecognition by adjusting the EPD period according to an embodiment of the present disclosure.

Referring to FIG. 7, FIG. 7 shows a speech recognition result output by the electronic device 200 upon receipt of the user's utterance of "Samsung Electronics has attained major achievements". Part (a) of FIG. 7 is the case where the EPD period is relatively short, e.g., 0.5 seconds. The electronic device 200 does not detect correctly the time point when the speech has been completed and converts the spoken words 710 constituting the speech to text; the text being displayed on the display 540.

Part (b) of FIG. 7 is the case where the EPD period is adjusted to adapt to the user's utterance pattern for speech recognition. For example, the EPD period may be 2 seconds. With the extended EPD period, the electronic device 200 may accurately detect the time point when the utterance was completed and convert the recognition result to a complete sentence 720 as displayed on the display 540. The electronic device 200 is capable of recognizing a complete sentence at one time so as to improve the speech recognition rate using an algorithm such as a connected words recognition algorithm.

Descriptions are made of the methods for changing the EPD period of the electronic device 200 for the pause period in such a way that the user selects a sentence or words displayed on the display 540, splits the sentence, or merges the words.

Figure 8:
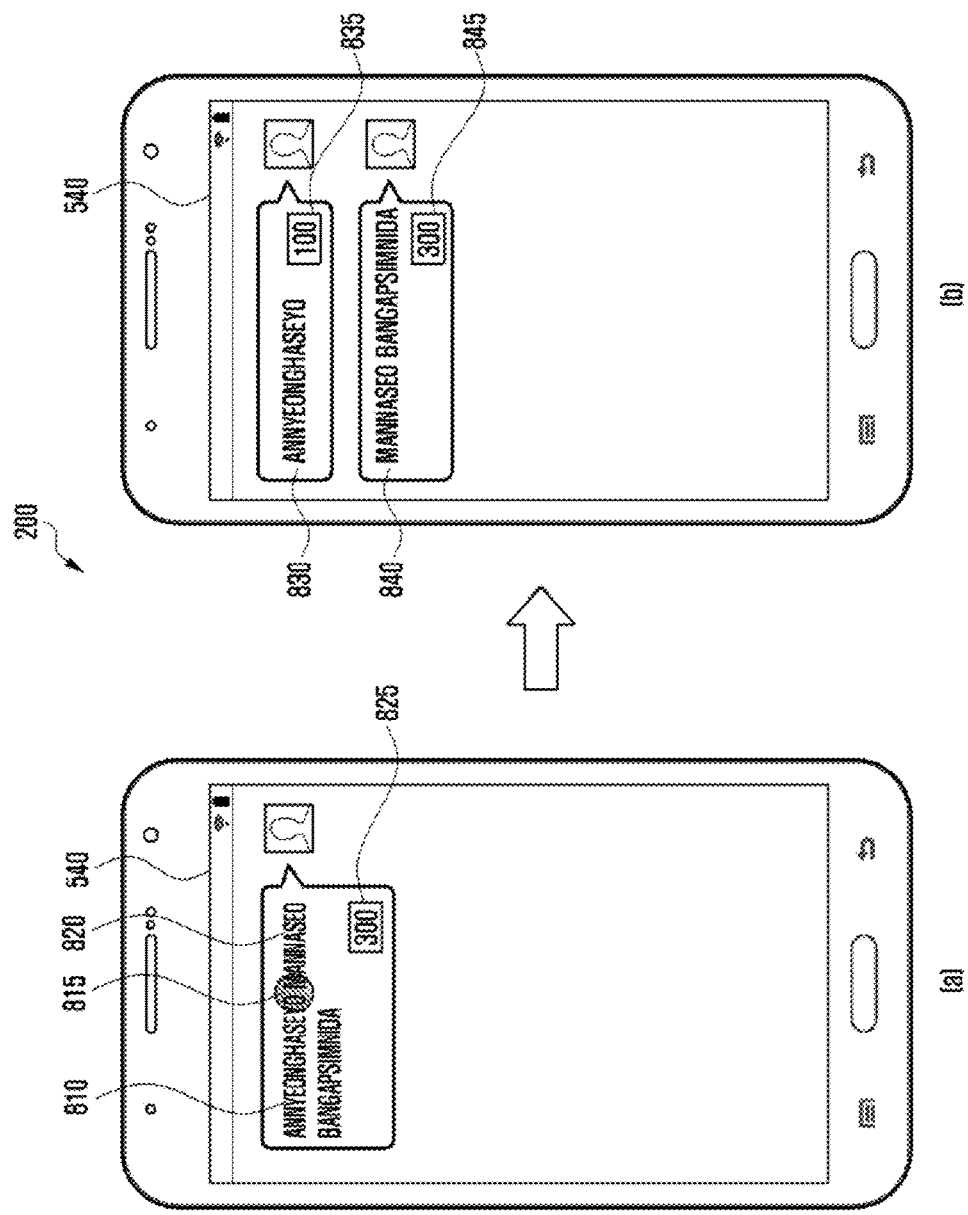
FIG. 8 is a diagram illustrating screen displays of an electronic device for explaining an operation of splitting a sentence displayed on the screen to adjust the EPD period according to an embodiment of the present disclosure.

FIG. 8 is a diagram illustrating screen displays of an electronic device for explaining an operation of splitting a sentence displayed on the screen to adjust the EPD period according to an embodiment of the present disclosure.

Referring to part (a) of FIG. 8, the electronic device 200 may recognize the speech and convert the speech into text, which may be displayed on the display 540. The electronic device 200 may recognize the two utterances "Annyeonghaseyo" 810 and "Mannaseo bangapsimnida" 820 and display the recognition result as one sentence. The electronic device 200 may also display the pause period of the speech along with the text. For example, the number "300" 825 following "Mannaseo bangapsimnida" 820 may indicate the length of the pause period. The electronic device 200 may display the pause period of 300 ms without a unit, i.e., "300" 825. The electronic device 200 may display a series of words or phrases including spaces therebetween. The spaces may include the above-described pause period and the spaces occurring when converting the speech to text.

If the EPD period of the electronic device 200 is longer than the pause period between the two utterances "Annyeonghaseyo" 810 and "Mannaseo bangapsimnida" 820, the electronic device 200 may recognize the two speeches as one sentence. Accordingly, the user may set the EPD period to the pause period following the utterance "Annyeonghaseyo" 810.

For example, the user may select "Annyeonghaseyo" 810. Although the selection can be made in a way of a typical touch input, it may also be possible to make a selection using a physical key or a separate sensor. For example, the user may select "Annyeonghaseyo" 810 by touching the space 815 between "Annyeonghaseyo" and "Mannaseo bangapsimnida".

The electronic device 200 may generate to the database a session comprised of the speech, the speech recognition result, and the pause period. If the user selects a sentence as described above, the electronic device 200 may retrieve speech data similar to or identical with the utterance "Annyeonghaseyo" from the database and set the EPD period of the electronic device 200 to the pause period associated with the retrieved speech data.

The electronic device 200 may display the sentences separately along with the operation of changing the EPD period.

Part (b) of FIG. 8 shows a screen display in which the sentences are displayed separately according to the user's selection. The electronic device 200 may display "Annyeonghaseyo" 830 and "Mannaseo bangapsimnida" 840 as separate sentences. The electronic device 200 may also display the pause periods of "100" 835 following "Annyeonghaseyo" and the pause period "300" 845 following "Mannaseo bangapsimnida" 840. The electronic device 200 may delete the session concerning "Annyeonghaseyo Mannaseo bangapsimnida" and manage the sessions of "Annyeonghaseyo" 830 and "Mannaseo bangapsimnida" 840 separately.

However, the speech data management is not limited thereby and may be performed in such a way of generating to the database sessions associated with "Annyeonghaseyo" 830 and "Mannaseo bangapsimnida" 840 while maintaining in the database the session associated with "Annyeonghaseyo Mannaseo bangapsimnida".

Figure 9:
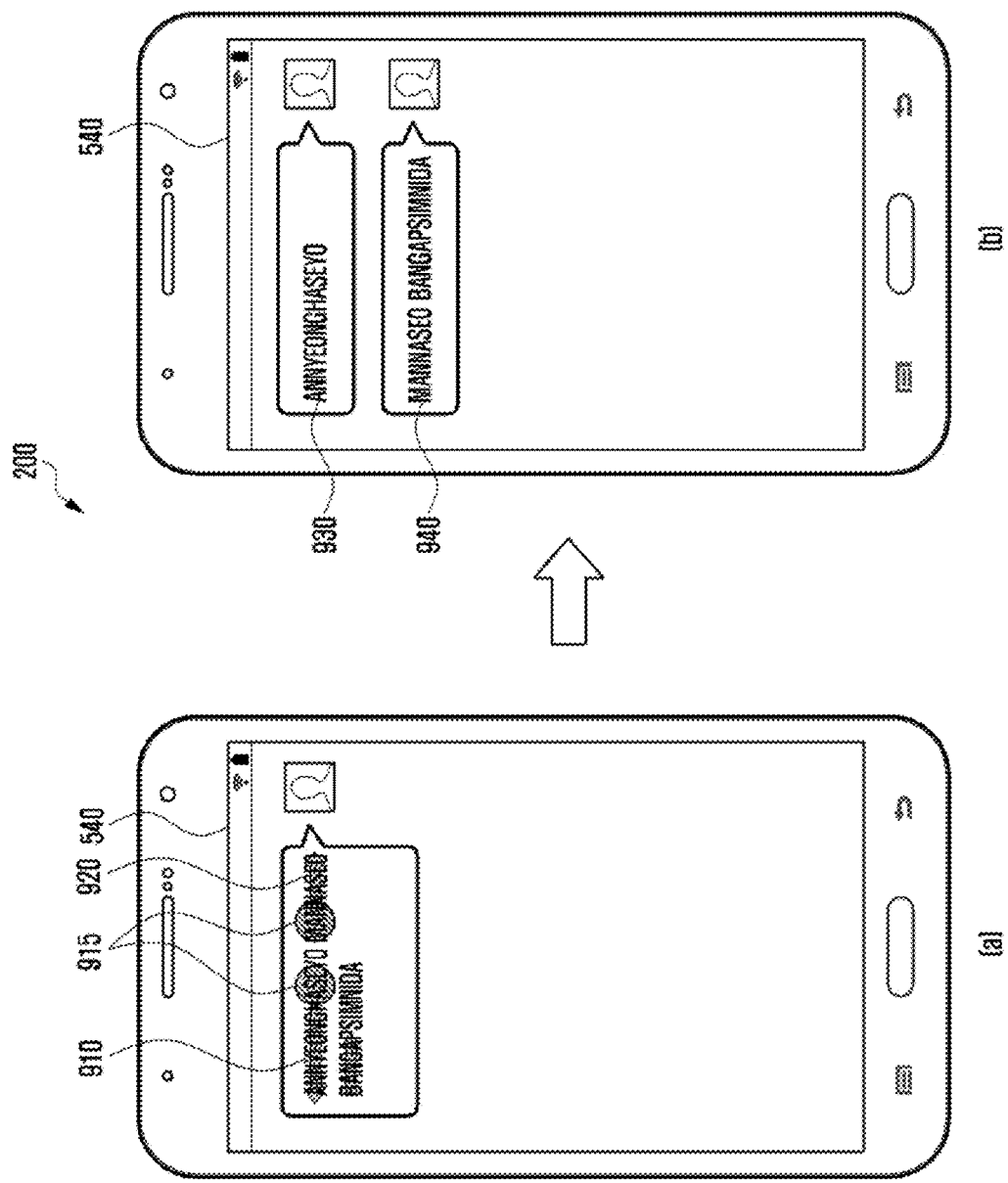
FIG. 9 is a diagram illustrating screen displays of an electronic device for explaining an operation of splitting a sentence displayed on the screen to adjust the EPD period according to an embodiment of the present disclosure.

FIG. 9 is a diagram illustrating screen displays of an electronic device for explaining an operation of splitting a sentence displayed on the screen to adjust the EPD period according to another embodiment of the present disclosure.

Referring to part (a) of FIG. 9, the electronic device 200 may recognize speech and convert the speech into text, the text being displayed on the display 540. The electronic device 200 may recognize two utterances "Annyeonghaseyo" 910 and "Mannaseo bangapsimnida" 920 as one sentence and display the sentence. The electronic device 200 may display a pause period of the speech along with the sentence. If the EPD period of the electronic device is longer than the pause period between the utterances "Annyeonghaseyo" 910 and "Mannaseo bangapsimnida" 920, the electronic device recognizes the two utterances as one sentence. In this case, the user may set the EPD period of the electronic device 200 to the pause period to improve the speech recognition rate.

For example, the user may split the sentence with a drag gesture as denoted by reference number 915 to change the EPD period of the electronic device. In detail, the user may make a multi-touch with two contact points on "Annyeonghaseyo" 910 and "Mannaseo bangapsimnida" 920 and drag the texts in opposite directions simultaneously as denoted by reference number 915.

If the speech is recognized, the electronic device may generate to the database a session comprised of the speech, the speech recognition result, and the pause period. If the user splits the sentence as described above, the electronic device 200 may update the EPD period with the pause period following "Annyeonghaseyo" 910.

In detail, the pause period between the two utterances "Annyeonghaseyo" 910 and "Mannaseo bangapsimnida" 920 may be shorter than the EPD period of the electronic device 200. In this case, the electronic device 200 may recognize the two utterances as one sentence. If the user splits the sentence with a split gesture, the pause period between "Annyeonghaseyo" 910 and "Mannaseo bangapsimnida" 920 may be configured as the EPD period of the electronic device so as to adapt the speech recognition condition to the user's utterance pattern.

For this purpose, the electronic device may retrieve speech data similar to or identical with "Annyeonghaseyo" 910 from the database and update the EPD period of the electronic device 200 to the pause period associated with the retrieved speech data.

The electronic device 200 may display the sentence in the state of being split on the display 540 as shown in part (b) of FIG. 9 along with the update of the EPD period. Since the process of splitting the sentence and generating sessions is identical with that described with reference to part (b) of FIG. 8, a detailed description thereof is omitted herein. As shown in part (b) of FIG. 9, the electronic device 200 may display "Annyeonghaseyo" 930 and "Mannaseo bangapsimnida" 940 as separate sentences.

Figure 10:
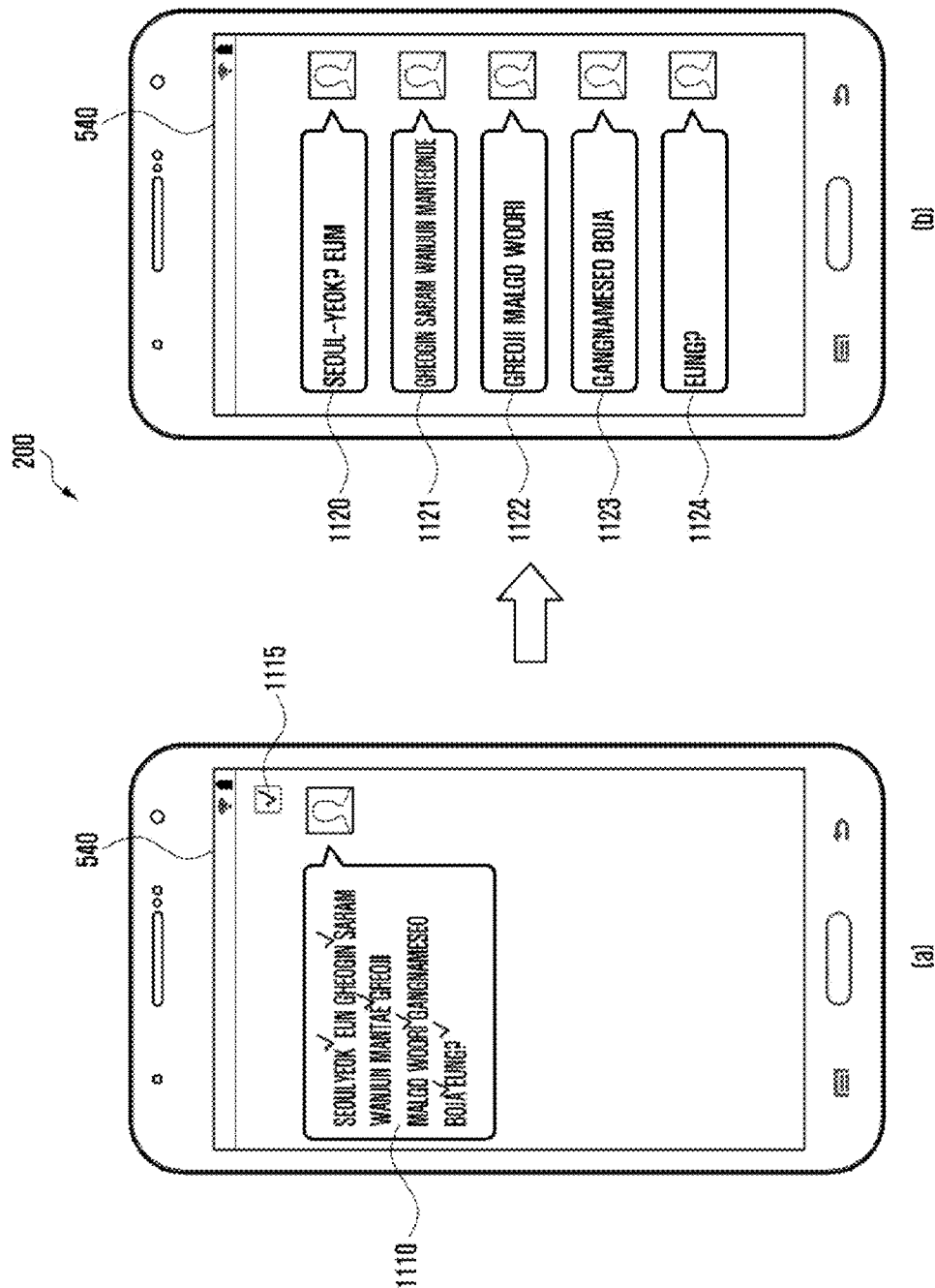
FIG. 10 is a diagram illustrating screen displays of an electronic device for explaining an operation of presenting split points automatically in a sentence displayed on the display according to an embodiment of the present disclosure.

FIG. 10 is a diagram illustrating screen displays of an electronic device for explaining an operation of presenting split points automatically in a sentence displayed on the display according to an embodiment of the present disclosure.

Referring to part (a) of FIG. 10, the electronic device may recognize speech, convert the speech into text, and display the text on the display 540. For example, the electronic device 200 may recognize speech "Seoul-yeok? Eum gheogin saram wanjun manteonde greoji malgo woori Gangnameseo boja eung?" (which may be translated as "Seoul Station? Well, it's way too crowded over there. Instead, let's meet at Gangnam. O.K.?") and display the corresponding text "Seoul-yeok eun gheogi saram wanjun mantae greoji malgo woori Gangnameseo boja eung?" as denoted by reference number 1110.

The real utterance and the recognized sentence may not be complete because the electronic device 200 performs speech recognition over a long interval. In this case, the user may split the sentence into a sequence of chunks to change the EPD period of the electronic device 200 and, in this case, the electronic device 200 may automatically present candidate split positions in the sentence. Although the utterance has been recognized as one sentence, the electronic device 200 may check the pause periods between the phrases or words constituting the sentence. Accordingly, the electronic device 200 may show some short pause periods between the phrases or words as the candidate split positions.

For example, the electronic device 200 may detect a short pause period between the utterances "Seoul-yeok" and "Geogin". Likewise, the electronic device may detect a short pause period between the utterances "eum gheogin" and "saram wanjun mantae". In this case, the electronic device 200 may present the candidate split positions when the user marks a check box 1115.

The user may select a phrase or word separated by the candidate split positions to change the EPD period of the electronic device. For example, if the user selects a phrase, the EPD period of the electronic device 200 may be set to the pause period of the selected phrase. The user may also select all of the phrases or words by drawing a closed curve surrounding the sentence with a touch and drag gesture or using a predetermined physical key. However, the selection operation is not limited to the aforementioned actions. If the user selects the whole sentence, the electronic device may set its EPD period to the shortest one of the pause periods between the phrases or words.

The electronic device 200 may display the phrases or words selected by the user on the display 540 as shown in part (b) of FIG. 10. By changing the EPD period as above, the electronic device 200 is capable of performing speech recognition with the updated EPD period so as to improve the accuracy of the speech recognition.

Part (b) of FIG. 10 shows a screen display of the speech recognition result performed with the changed EPD period. The electronic device 200 may separately display a series of phrases or words "Seoul-yeok? Eum" 1120, "gheogin saram wanjun manteonde" 1121, "greoji malgo woori" 1122, "Gangnameseo boja" 1123, and "eung?" 1124 constituting the sentence.

Since the process of splitting the sentence and generating sessions is identical with that described with reference to part (b) of FIG. 8, a detailed description thereof is omitted herein.

Figure 11:
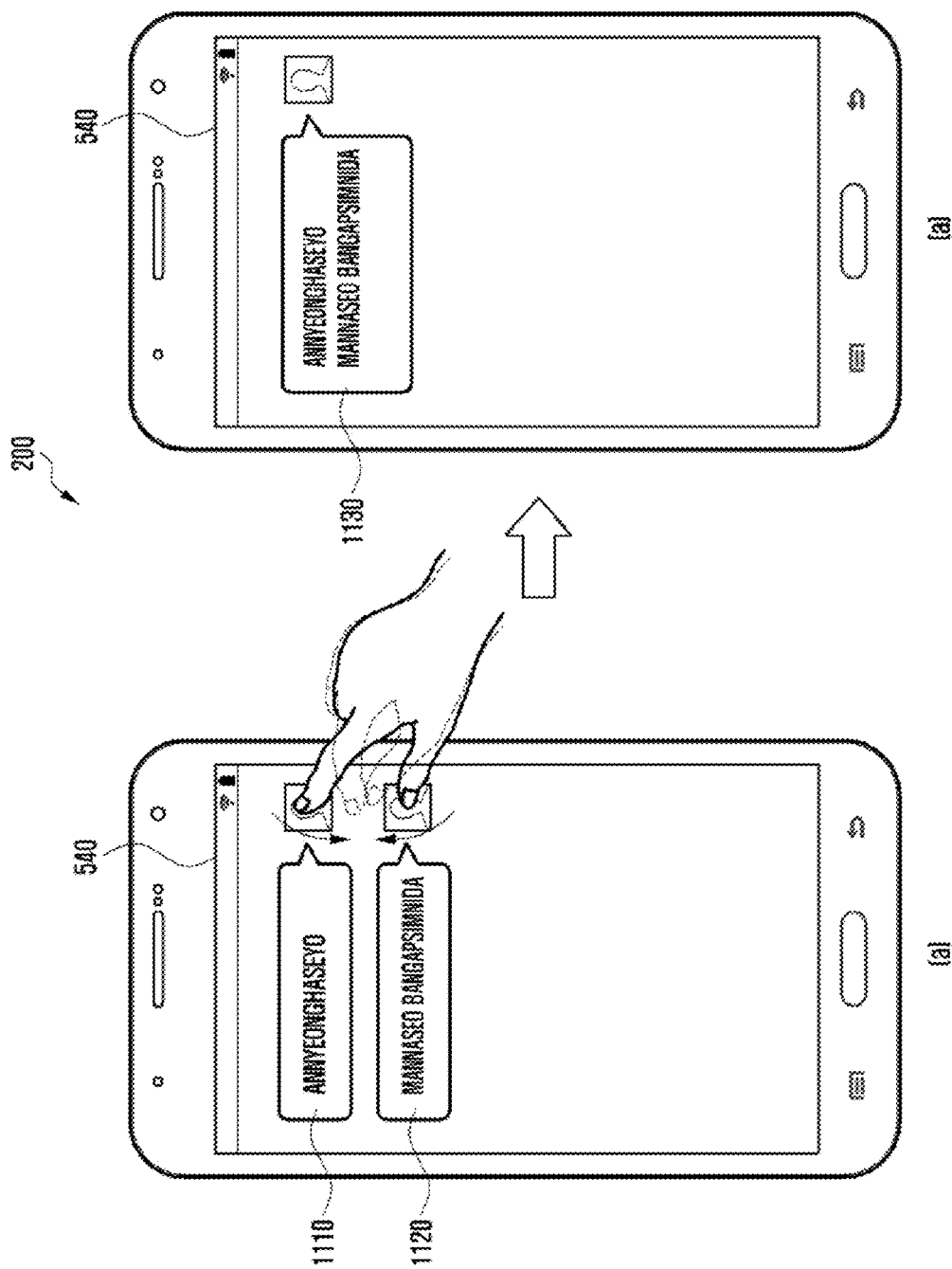
FIG. 11 is a diagram illustrating screen displays of an electronic device for explaining an operation of changing the EPD period by merging the sentences displayed on the display into one sentence according to an embodiment of the present disclosure.

FIG. 11 is a diagram illustrating screen displays of an electronic device for explaining an operation of changing the EPD period by merging the sentences displayed on the display into one sentence according to an embodiment of the present disclosure.

Referring to part (a) of FIG. 11, the electronic device 200 may recognize speech, convert the speech to text, and display the text on the display 540. The electronic device 200 may recognize the utterances as two sentences of "Annyeonghaseyo" 1110 and "Mannaseo bangapsimnida" 1120 and may display the sentences separately. The electronic device 200 may display the text phrases with the corresponding pause periods of the displayed speech. If the EPD period of the electronic device 200 is shorter than the pause period between the utterances "Annyeonghaseyo" 1110 and "Mannaseo bangapsimnida" 1120, the electronic device 200 recognizes the utterances as two sentences. Although the two sentences are separated from each other, they may be handled as one sentence. Accordingly, the user may set the EPD period of the electronic device 200 to the pause period following the latter one of the two sentences to adapt the speech recognition function to the personal utterance characteristic.

For example, the utterance ""Mannaseo bangapsimnida" 1120 may have two pause periods. If the user's utterance has ended right after "Mannaseo bangapsimnida" 1120, the pause period of "Mannaseo bangapsimnida" 1120 may be equal to the EPD period of the electronic device 200. If another utterance follows the utterance "Mannaseo bangapsimnida" 1120, the period between the two utterances may become the pause period of "Mannaseo bangapsimnida" 1120.

The user may make a gesture input to select and merge the two sentences so as to change the EPD period of the electronic device. In order to merge the two sentences, it may be possible to make a gesture of selecting one of the sentences and dragging the selected sentence onto the other sentence or selecting the two sentences simultaneously and dragging them close to each other so as to be overlapped.

Once the speech has been recognized as above, the electronic device 200 may generate to the database a session comprised of the speech, the speech recognition result, and the pause period. If the user merges the two sentences as above, the electronic device 200 may retrieve speech data similar to or identical with the utterance "Mannaseo bangapsimnida" 1120 and may set the EPD period of the electronic device 200 to the corresponding pause period.

The electronic device 200 may also set the EPD period of the electronic device 200 to the longest one between the pause periods of the two utterances "Annyeonghaseyo" 1110 and "Mannaseo bangapsimnida" 1120.

The electronic device 200 may display the emerged sentence on the display 540 along with the operation of changing the EPD period.

Part (b) of FIG. 11 shows an operation of merging two sentences according to the user's gesture input. The electronic device 200 may merge the two sentences "Annyeonghaseyo" 1110 and "Mannaseo bangapsimnida" 1120 into one sentence "Annyeonghaseyo Mannaseo bangapsimnida" 1130 in response to the user's gesture input. The electronic device 200 may delete from the database the sessions related to the sentences "Annyeonghaseyo" 1110 and "Mannaseo bangapsimnida" 1120 and add a session to the database for management related to the merged sentence "Annyeonghaseyo Mannaseo bangapsimnida" 1130.

However, the present disclosure is not limited thereto, and it may be possible to add to the database the session related to the merged sentence "Annyeonghaseyo Mannaseo bangapsimnida" 1130 while maintaining in the database the two sentences "Annyeonghaseyo" 1110 and "Mannaseo bangapsimnida" 1120.

Figure 12:
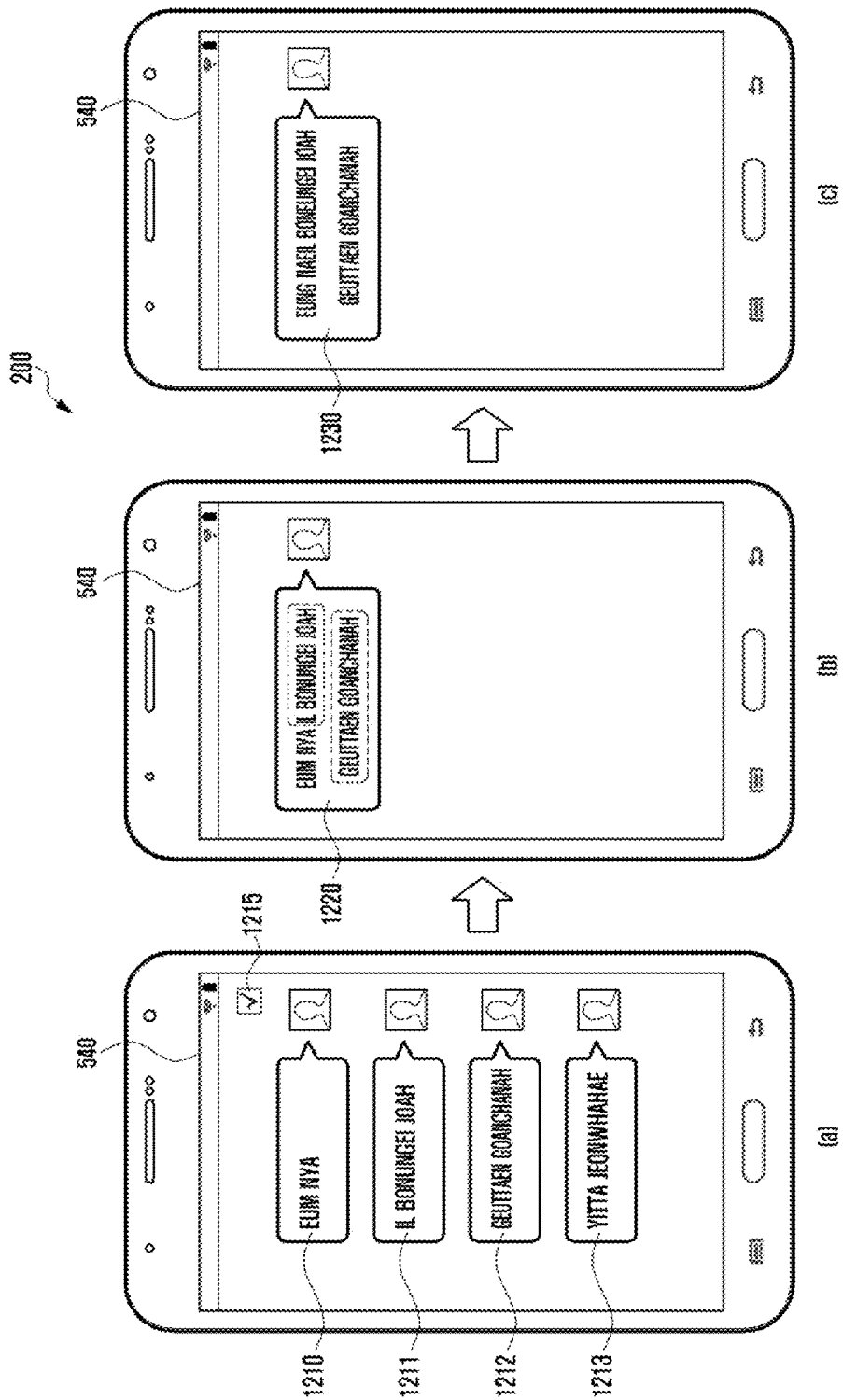
FIG. 12 is a diagram illustrating screen displays of an electronic device for explaining an operation of changing the EPD period by selecting or merging the sentences displayed on the display according to an embodiment of the present disclosure.

FIG. 12 is a diagram illustrating screen displays of an electronic device for explaining an operation of changing the EPD period by selecting or merging the sentences displayed on the display according to an embodiment of the present disclosure.

Referring to part (a) of FIG. 12, the electronic device may recognize speech, convert the speech to text, and display the text on the display 540. The electronic device 200 may recognize the speech "eung naeil boneungei joah geuttaen goanchanah yitta jeonwhahae" (which may be translatable as "O.K. Meeting tomorrow is fine. It's good then. Call me later") as a series of phrases "eum nya" 1210, "il bonungei joah" 1211, "geu ttaen goanchanah" 1212, and "yitta jeonwhahae" 1213 and may display the respective phrases. The electronic device 200 may display the text phrases with the corresponding pause periods.

Because the EPD period of the electronic device 200 is shorter than each of the pause periods between the phrases 1210 to 1213, the electronic device 200 may recognize a sentence as a series of phrases. In this case, the speech recognition accuracy may be low because one sentence is split into short phrases. Thus, the user may adjust the EPD period in order for the electronic device to recognize the phrases as one sentence.

Referring to part (a) of FIG. 12, the user may select the phrases "eum nya" 1210 to "geu ttaen goanchanah" 1212. Such a selection can be made in various ways. For example, it may be possible to select the phrases "eum nya" 1210 to "geu ttaen goanchanah" 1212 one by one and then mark a check box 1215 for completing the selection.

It may also be possible for the user to draw a closed curve surrounding the phrases "eum nya" 1210 to "geu ttaen goanchanah" 1212 with a touch and drag gesture to select the phrases. However, the phrase selection method is not limited thereby.

The electronic device 200 may perform speech recognition once again on the selected phrases to improve the speech recognition accuracy. In this case, it is possible to use a connected words recognition function with the successive phrases so as to improve the speech recognition accuracy.

Referring to part (b) of FIG. 12, the electronic device 200 may display the selected phrases as one sentence. For example, the electronic device 200 may display the text "eum nya il bonungei joah geuttaen goanchanah" 1220 on the display 540. Then the electronic device 200 may perform speech recognition on the merged utterance using the connection word recognition function with the successive phrases. With reference to part (c) of FIG. 12, the electronic device 200 may display the speech recognition result with the enhanced accuracy on the display 540.

Once the speech has been recognized as above, the electronic device 200 may generate to the database a session comprised of the speech, the speech recognition result, and the pause period. If the user merges a plurality of phrases as above, the electronic device 200 may set the EPD period to the pause period following the last one of the phrases merged into the sentence. For example, the electronic device 200 may retrieve the speech data most similar to or identical with the speech recognition result from the database and update its EPD period to the corresponding pause period. The electronic device 200 may also set its EPD period to the longest one of the pause periods of the phrases merged into the sentence.

The electronic device 200 may display the merged sentence on the display 540 along with the operation of changing the EPD period.

Part (c) of FIG. 12 shows an example of displaying a sentence acquired by correcting the merged sentence according to the user input. The electronic device 200 may merge the phrases "eum nya" 1210, "il bonungei joah" 1211, "geu ttaen goanchanah" 1212, and "yitta jeonwhahae" 1213 into a sentence "eung naeil boneungei joah geuttaen goanchanah yitta jeonwhahae" 1230. The electronic device 200 may delete from the database the sessions concerning the phrases "eum nya" 1210, "il bonungei joah" 1211, "geu ttaen goanchanah" 1212, and "yitta jeonwhahae" 1213 and add to the database the session concerning the sentence "eung naeil boneungei joah geuttaen gwenchanah yitta jeonwhahae" 1230.

However, the speech data management is not limited thereby, and it may be performed in such a way of generating to the database a session associated with the sentence "eung naeil boneungei joah geuttaen gwenchanah yitta jeonwhahae" 1230 while maintaining the sessions associated with the phrases "eum nya" 1210, "il bonungei joah" 1211, "geu ttaen goanchanah" 1212, and "yitta jeonwhahae" 1213.

Figure 13:
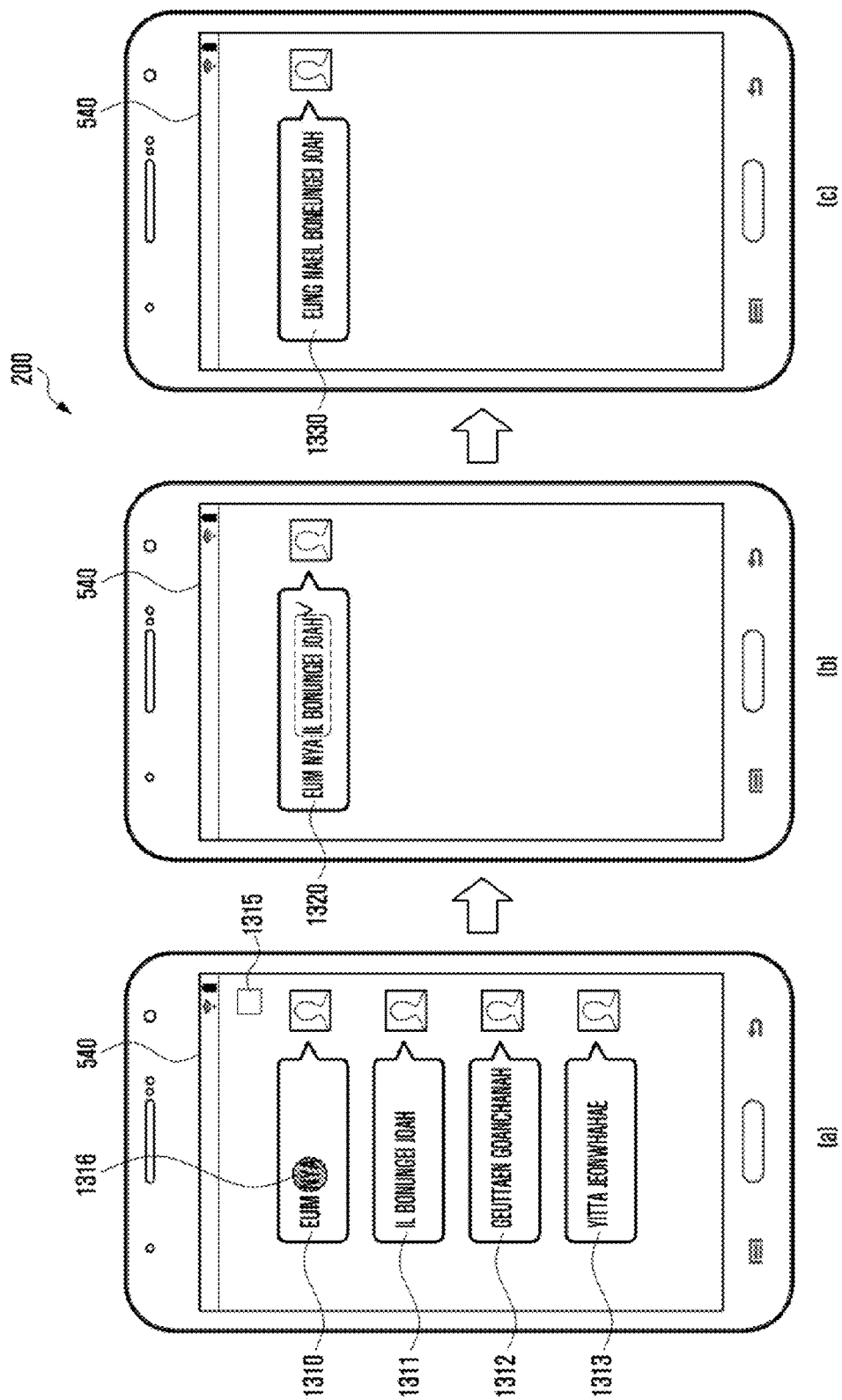
FIG. 13 is a diagram illustrating screen displays of an electronic device for explaining an operation of recommending candidate phrases on the display according to an embodiment of the present disclosure.

FIG. 13 is a diagram illustrating screen displays of an electronic device for explaining an operation of recommending candidate phrases on the display according to an embodiment of the present disclosure.

Referring to part (a) of FIG. 13, the electronic device 200 may recognize speech, convert the speech to text, and display the text on the display 540. The electronic device 200 may recognize the utterance "eung naeil boneungei joah geuttaen gwenchanah yitta jeonwhahae" as a series of phrases "eum nya" 1310, "il bonungei joah" 1311, "geu ttaen goanchanah" 1312, and "yitta jeonwhahae" 1313 and may display the respective phrases. The electronic device 200 may display the text phrases with the corresponding pause periods.

Because the EPD period of the electronic device 200 is shorter than each of the pause periods between the phrases 1310 to 1313, the electronic device 200 may recognize a sentence as a series of phrases. In this case, the speech recognition accuracy may be low because one sentence is split into short phrases. Thus, the user may adjust the EPD period in order for the electronic device to recognize the phrases as one sentence.

For example, the user may change the EPD period of the electronic device 200 by selecting the phrases that the user wants to be recognized as one sentence. In detail, the user may select the phrase "eum nya" 1310 as denoted by reference number 1316 as shown in part (a) of FIG. 13. Such a selection can be made in various ways. The user may select intended phrases using a touch gesture or a physical key. However, the phrase selection method is not limited thereby.

The electronic device 200 may perform speech recognition again on the utterances corresponding to the selected phrases to recognize a complete sentence, resulting in improvement of speech recognition accuracy. In the case of performing speech recognition again, it may be possible to improve the speech recognition accuracy using the connected words recognition function with the successive phrases.

Referring to part (b) of FIG. 13, the electronic device 200 may display the phrases selected by the user. Then the electronic device 200 may perform speech recognition on the selected phrases using the connected words recognition function with the successive phrases.

The electronic device 200 may recommend a candidate sentence corresponding to the result of merging the selected phrases. For example, the electronic device 200 may present "eum nya il bonungei joah" 1320 predicted as a most likely sentence of the successive "eum nya" 1310 and "il bonungei joah" 1311 on the display 540. With reference to part (c) of FIG. 13, the electronic device 200 may display the speech recognition result with the enhanced accuracy achieved through re-recognition.

Once the speech has been recognized as above, the electronic device 200 may generate to the database a session comprised of the speech, the speech recognition result, and the pause period. If the user merges a plurality of phrases as described above, the electronic device 200 may set its EPD period to the pause period following the last one of the phrases merged into the sentence. For example, the electronic device 200 may retrieve from the database the speech data most similar to or identical with the speech recognition result "il bonungei joah" 1311 and set its EPD period to the pause period corresponding to the retrieved speech data. The electronic device 200 may also set its EPD period to the longest one of the pause periods of the merged phrases.

The electronic device 200 may display the sentence acquired by merging the phrases on the display 540 along with the operation changing the EPD period.

Part (c) of FIG. 13 shows a case in which the user corrects the sentence acquired by merging the phrases. The electronic device 200 may display the sentence "eung naeil boneungei joah" 1330 corrected by the user as a result of merging the phrases "eum nya" 1310 and "il bonungei joah" 1311.

Since the process of splitting a sentence and generating a session associated with the sentence is identical with that described with reference to part (b) of FIG. 8, a detailed description thereof is omitted herein.

Figure 14:
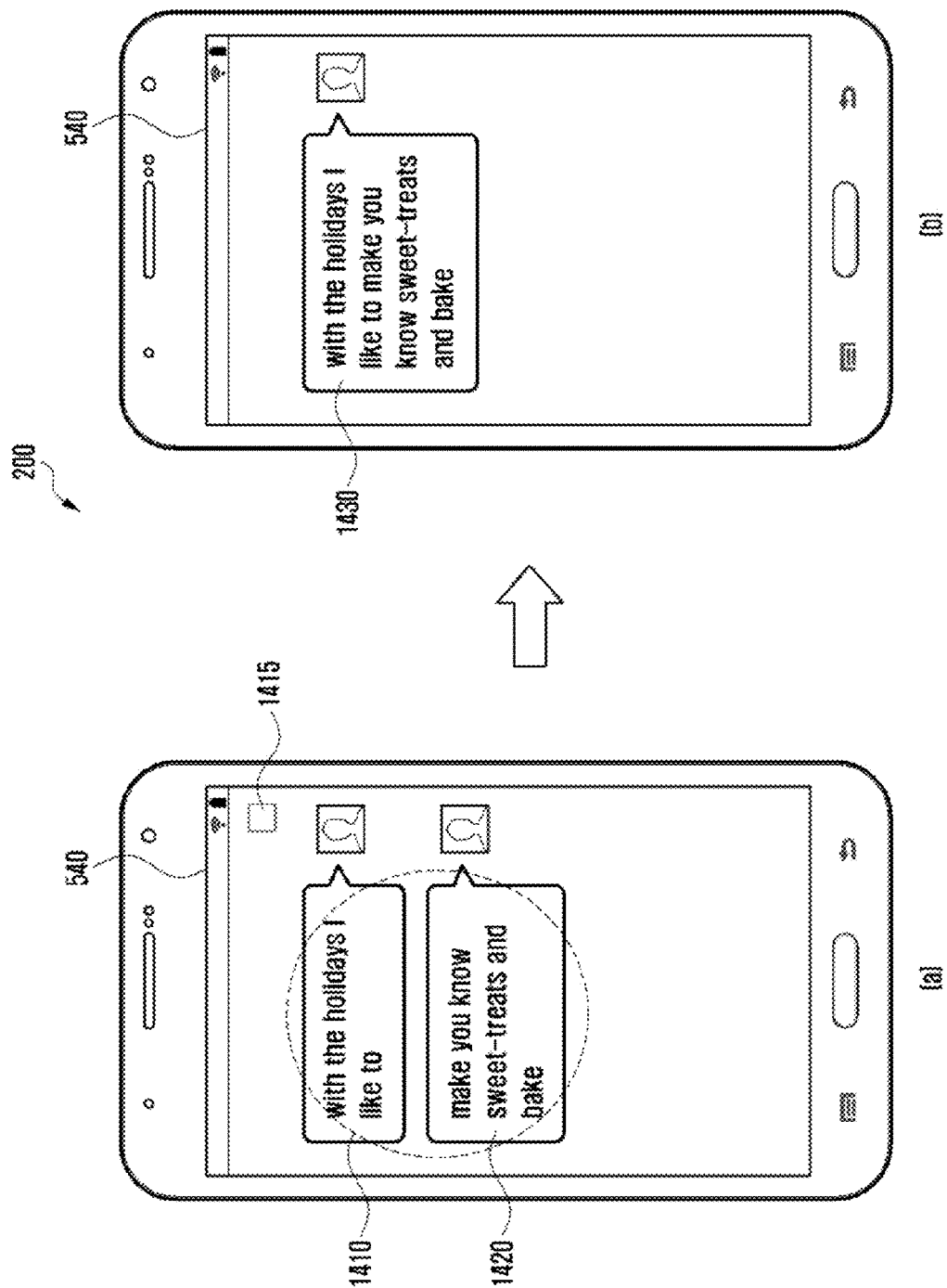
FIG. 14 is a diagram illustrating screen displays of an electronic device for explaining an operation of merging English phrases into a sentence and displaying the merged sentence according to an embodiment of the present disclosure.

FIG. 14 is a diagram illustrating screen displays of an electronic device for explaining an operation of merging English phrases into a sentence and displaying the merged sentence according to an embodiment of the present disclosure.

Referring to part (a) of FIG. 14, the electronic device 200 may recognize English speech, convert the speech to text, and display the text on the display 540. The electronic device may receive the utterance "with the holidays I like to make you know sweet-treats and bake", recognize the utterance as two phrases "with the holidays I like to" 1410 and "make you know sweet-treats and bake" 1420, and display the phrases separately. The electronic device 200 may display the phrases along with corresponding pause periods.

If the EPD period of the electronic device 200 is shorter than a pause period detected in an utterance, the electronic device 200 may recognize the utterance as two phrases. In this case, a sentence may be split into short phrases; thus, the speech recognition accuracy decreases.

For example, the user may change the EPD period of the electronic device 200 by selecting the phrases that the user wants to be recognized as one sentence. As shown in part (a) of FIG. 14, the user may select the phrases "with the holidays I like to" (1410) and "make you know sweet-treats and bake" 1420. Such a selection can be made in various ways. The user may select the phrases one by one and mark a check box 1415 for completing the selection. The user may also select the phrases by drawing a closed curve surrounding the phrases "with the holidays I like to" 1410 and "make you know sweet-treats and bake" 1420. However, the phrase selection method is not limited thereto.

The electronic device 200 may perform speech recognition again on the utterance corresponding to the selected phrases to improve the speech recognition accuracy. In this case, it may be possible to improve the accuracy of speech recognition by using a connected words recognition function with the successive phrases. With reference to part (b) of FIG. 14, the electronic device 200 may display the speech recognition result with enhanced accuracy on the display 540.

Once the speech has been recognized as above, the electronic device 200 may generate to the database a session comprised of the speech, the speech recognition result, and the pause period. If the user merges a plurality of phrases as above, the electronic device 200 may set the EPD period to the pause period following the last one of the phrases merged into the sentence. For example, the electronic device 200 may retrieve the speech data most similar to or identical with the speech recognition result "make you know sweet-treats and bake" 1420 from the database and update its EPD period to the corresponding pause period. The electronic device 200 may also set its EPD period to the longest one of the pause periods of the phrases constituting the sentence.

The electronic device 200 may display the merged sentence on the display 540 along with the operation of changing the EPD period.

Part (b) of FIG. 14 is an example of displaying the sentence formed by merging the phrases selected by the user. The electronic device 200 may display the phrases "with the holidays I like to" 1410 and "make you know sweet-treats and bake" 1420 in the form of a sentence of "with the holidays I like to make you know sweet-treats and bake" 1430 according to the user's manipulation. The electronic device 200 may delete from the database the sessions concerning the phrases "with the holidays I like to" 1410 and "make you know sweet-treats and bake" 1420 and add to the database the session concerning the sentence "with the holidays I like to make you know sweet-treats and bake" 1430.

However, the speech recognition operation is not limited thereto and may be performed in such a way of adding to the database the session concerning the sentence "with the holidays I like to make you know sweet-treats and bake" 1430 while maintaining the sessions concerning the phrases "with the holidays I like to" 1410 and "make you know sweet-treats and bake" 1420.

As described above, the speech end time detection method of the present disclosure is capable of allowing the user to adjust the EPD period while checking the speech recognition result intuitively.

FIG. 15 is a diagram illustrating screen displays of an electronic device for explaining an operation of splitting a sentence into phrases and merging phrases into a sentence according to an embodiment of the present disclosure.

The electronic device 200 may include a plurality of displays. For example, the electronic device 200 may include a first display 1501 and a second display 1502. However, the number of displays of the electronic device is not limited thereto.

Part (a) of FIG. 15 shows an example of splitting a sentence.

Referring to part (a) of FIG. 15, the electronic device 200 recognizes speech, converts the speech to text, and displays the text on the first display 1501. The electronic device 200 may recognize a series of input utterances "Annyeonghaseyo" 1511 and "Mannaseo bangapsimnida" 1512 as one sentence "Annyeonghaseyo Mannaseo bangapsimnida" 1512 and may display the sentence. The electronic device 200 may display the pause period of the utterance along with the text. The electronic device 200 may recognize the two sentences as one sentence because the EPD period of the electronic device 200 is longer than the pause period between "Annyeonghaseyo" 1511 and "Mannaseo bangapsimnida" 1512. In this case, the electronic device 200 may set its EPD period to the pause period following "Annyeonghaseyo" 1511 to improve the speech recognition rate.

For this purpose, with reference to part (a) of FIG. 15, the user may select the phrase "Annyeonghaseyo" 1511. It is typical to make a selection input with a touch gesture, but the user may use a physical key or a separate sensor. The user may select the space 1515 between the phrases "Annyeonghaseyo" 1511 and "Mannaseo bangapsimnida" 1512.

Once it has recognized the speech, the electronic device 200 may generate to the database a session comprised of the speech, the speech recognition result, and the pause period. If the user selects a phrase as above, the electronic device 200 may retrieve the speech data most similar to or identical with the selected phrase "Annyeonghaseyo" 1511 from the data base and set its EPD period to the pause period concerning the retrieved speech data.

The electronic device 200 may display the phrases separately on the display 1502 along with the operation of changing the EPD period. For example, the electronic device 200 may display the phrases "Annyeonghaseyo" 1520 and "Mannaseo bangapsimnida" 1521 on the second display 1502 in response to the user's selection input made as above.

The electronic device 200 may delete from the database the session concerning the sentence "Annyeonghaseyo Mannaseo bangapsimnida" 1510 and manage separately in the database the sessions concerning the phrases "Annyeonghaseyo" 1520 and "Mannaseo bangapsimnida" 1521. However, the speech data management is not limited thereby and may be performed in such a way of adding the sessions concerning the phrases "Annyeonghaseyo" 1520 and "Mannaseo bangapsimnida" 1521 while maintaining the session concerning the sentence "Annyeonghaseyo Mannaseo bangapsimnida" 1510.

Part (b) of FIG. 15 shows an example of splitting a sentence.

Referring to part (b) of FIG. 15, the electronic device may recognize speech, convert the speech to text, and display the text on the first display 1501. The electronic device 200 may recognize the speech "eung naeil boneungei joah geuttaen gwenchanah yitta jeonwhahae" as a series of phrases "eum nya" 1530, "il bonungei joah" 1531, "geu ttaen goanchanah" 1532, and "yitta jeonwhahae" 1533 and may display the phrases separately.

The electronic device 200 may recognize the speech as a plurality of phrases because its EPD period is shorter than each of the pause periods between the phrases 1530 and 1533. In this case, one sentence may be split into short parts, which will reduce the speech recognition accuracy. Thus it may be necessary for the user to merge some phrases to adjust the EPD period such that the electronic device 200 recognizes the merged phrases as one sentence.

For example, the user may change the EPD period by selecting and merging some phrases that the user wants to be recognized as one sentence. As shown in part (a) of FIG. 15, the user may select the phrases "eum nya" 1530, "il bonungei joah" 1531, and "geu ttaen goanchanah" 1532. Such a selection may be made in various ways. It may be possible to select the phrases 1530 to 1533 one by one and mark a check box 1535 for completing the selection.

The user may select the phrases "eum nya" 1530, "il bonungei joah" 1531, and "geu ttaen goanchanah" 1532 by drawing a closed curve surrounding the corresponding phrases (as shown by the dashed circular line in part (b) of FIG. 15). However, the selection operation is not limited thereby.

The electronic device 200 may perform speech recognition on the utterance corresponding to the selected phrases to improve the speech recognition accuracy. In this case, it may be possible to improve the speech recognition accuracy using the connected words recognition function with the successive phrases.

The electronic device 200 may perform speech recognition again on the phrases selected by the user and display the speech recognition result as one sentence on the second display 1502. For example, the electronic device 200 may display the sentence "eung naeil boneungei joah geuttaen gwenchanah" 1540 on the second display.

Once it has recognized the speech as above, the electronic device 200 may generate to the database a session comprised of the speech, the speech recognition result, and the pause period. If the user merges a plurality of phrases as above, the electronic device 200 may set the EPD period to the pause period following the last one of the phrases merged into the sentence. For example, the electronic device 200 may retrieve the speech data most similar to or identical with the speech recognition result "geu ttaen goanchanah" 1532 from the database and set its EPD period to the pause period corresponding to the retrieved speech data. The electronic device 200 may also set its EPD period to the longest one of the pause periods of the phrases merged into the sentence.

The electronic device 200 may delete from the database the sessions concerning the phrases "eum nya" 1530, "il bonungei joah" 1531, "geu ttaen goanchanah" 1532, and "yitta jeonwhahae" 1533 and add to the database a session concerning the sentence "eung naeil boneungei joah geuttaen gwenchanah" 1540.

However, the speech data management is not limited thereby and may be performed in such a way of adding to the database the session concerning the sentence "eung naeil boneungei joah geuttaen gwenchanah" 1540 while maintaining the sessions concerning the phrases "eum nya" 1530, "il bonungei joah" 1531, "geu ttaen goanchanah" 1532, and "yitta jeonwhahae" 1533.

As described above, the speech end time detection method of the present disclosure is capable of allowing the user to adjust the EPD period while checking the speech recognition intuitively.

Figure 16:
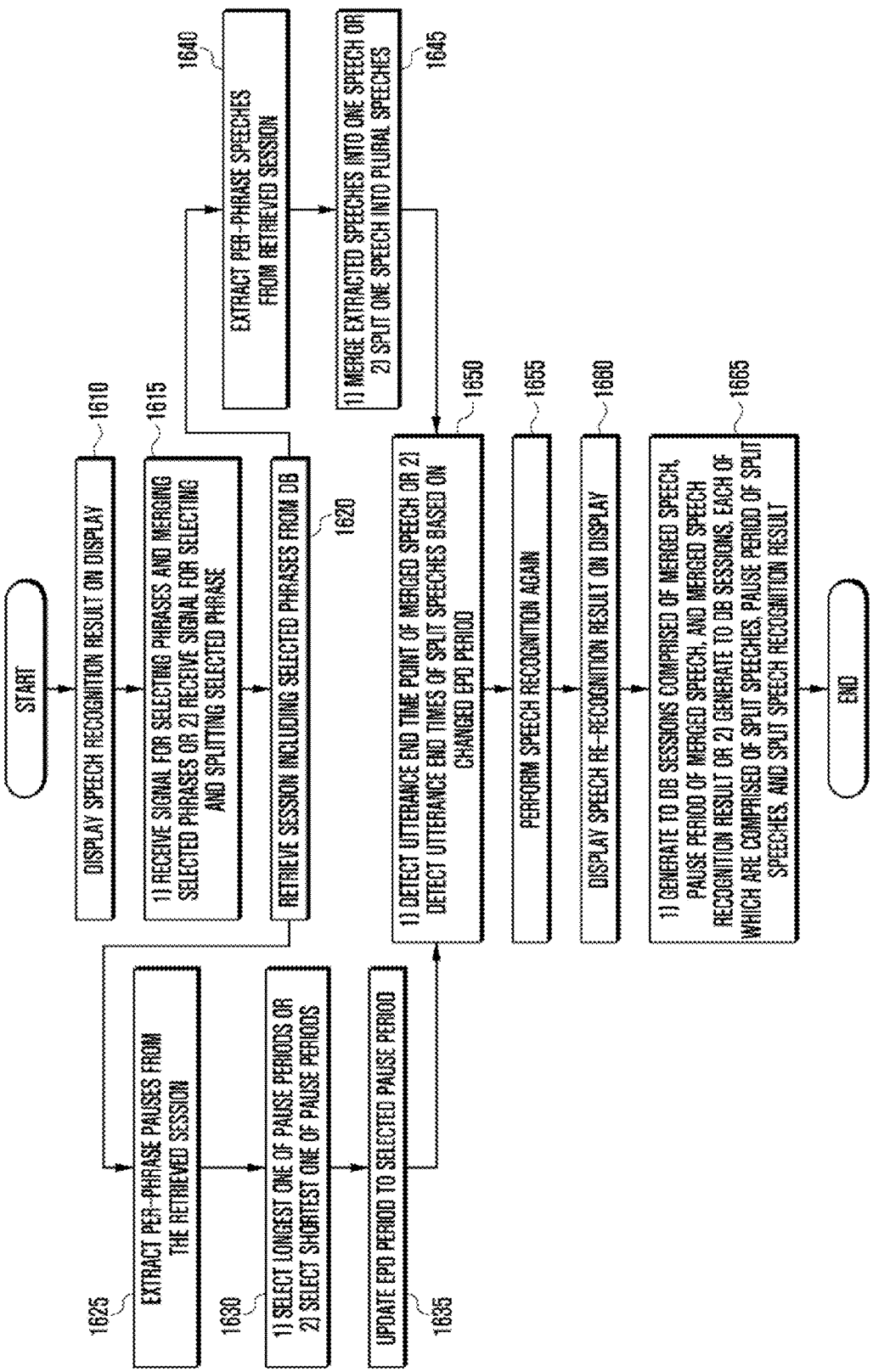
FIG. 16 is a flowchart illustrating a speech recognition method of an electronic device according to an embodiment of the present disclosure.

FIG. 16 is a flowchart illustrating a speech recognition method of an electronic device according to an embodiment of the present disclosure.

Referring to FIG. 16, the electronic device 200 may display a speech recognition result at operation 1610. The speech recognition result may be displayed in the form of a series of characters, numbers, and/or special characters or a complete sentence comprised thereof. The following description is made under the assumption that at least one sentence (phrase) is displayed.

The electronic device 200 detects a user input made to the sentence at operation 1615. The user input may be a command to select phrases and merge the selected phrases or a command to select a sentence and split the selected sentence into phrases. The user input may be made with a touch gesture on a touchscreen of the display unit 540 or by means of a physical key, without limitation thereby.

The electronic device may retrieve the session including the selected phrase from the DB 509 at operation 1620. Operations 1625 to 1635, 1640, and 1645 may be performed in parallel or in series. In the following description, it is assumed that the operations are performed in parallel.

The electronic device 200 may extract the pause periods of the respective phrases included in the retrieved session at operation 1625. The electronic device 200 may select the longest or shortest one of the pause periods at operation 1630. For example, if the user input is made for selecting phrases and merging the selected phrases at operation 1615, the electronic device 200 may select the longest one of the extracted pause periods. Otherwise, if the user input is made for selecting a sentence and splitting the sentence into phrases at operation 1615, the electronic device may select the shortest one of the extracted pause periods. However, the pause period selection operation is not limited thereby.

The electronic device 200 may set the EPD period to the selected pause period at operation 1635.

The electronic device 200 may extract per-phrase speeches from the retrieved session at operation 1640. The electronic device 200 may merge the extracted speeches into one speech or split the extracted speech into plural speeches at operation 1645. For example, if the user input is made for selecting phrases and merging the selected phrases at operation 1615, the electronic device may merge the extracted speeches into one speech. Otherwise, if the user input is made for selecting a sentence and splitting the sentence into phrases at operation 1615, the electronic device 200 may split the extracted speech into plural speeches.

The electronic device 200 may detect the utterance end time point of the merged speech or the utterance end time points of the respective split speeches based on the changed EPD period at operation 1650. For example, if the user input is made for selecting phrases and merging the selected phrases at operation 1615, the electronic device 200 may detect the utterance end time point of the merged speech based on the changed EPD period. Otherwise, if the user input is made for selecting a sentence and splitting the sentence into phrases at operation 1615, the electronic device 200 may detect the utterance end time points of the respective split speeches.

The electronic device 200 may perform speech recognition again based on the re-detected utterance end time point(s) at operation 1655. The electronic device 200 may display the new speech recognition result on the display 540 at operation 1660. The speech recognition result may include characters, numbers, and/or special characters or a complete sentence comprised thereof.

The electronic device 200 may update the DB 509 at operation 1665. For example, if the user input is made for selecting phrases and merging the selected phrases at operation 1615, the electronic device 200 may generate a new session comprised of the merged speech, the pause period of the merged speech, and the merged speech recognition result. Otherwise, if the user input is made for selecting a sentence and splitting the sentence into phrases at operation 1615, the electronic device 200 may generate new sessions, each of which are comprised of the split speeches, the pause period of the split speeches, and the split speech recognition result. The electronic device 200 may store the newly generated session(s) in the DB 509.

As described above, the speech recognition method of the present disclosure is capable of improving the speech recognition rate by allowing the user to adjust the EPD period.

According to various embodiments of the present disclosure, the speech recognition method of the electronic device may include recognizing speech input by a user and updating a predetermined speech end detection period to the pause period between a speech stop time point and a speech resume time point.

According to various embodiments of the present disclosure, the speech recognition method of the electronic device may include updating the predetermined speech end detection period to the pause period; packing the speech, the speech recognition result, and the pause period; and storing the package.

According to various embodiments of the present disclosure, the speech recognition method of the electronic device may further include determining, if speech is input after updating the speech end detection period, whether the speech ends based on the updated speech end detection period.

According to various embodiments of the present disclosure, updating the predetermined speech end detection period to the pause period may include displaying the speech in the form of a series of words or phrases having spaces therebetween and receiving a user input for updating the speech end detection period.

In the speech recognition method of the electronic device according to various embodiments of the present disclosure, the user input may be a command for selecting at least one of the words or phrases or the spaces to split or merge the successive words or phrases.

According to various embodiments of the present disclosure, splitting the successive words or phrases may include updating the speech end detection period to the pause period of at least one of the words or phrases.

According to various embodiments of the present disclosure, merging the successive words or phrases may include updating the speech end detection period to the longest one of the pause periods of the merged words or phrases.

As described above, the EPD period adjustment method for the speech end detection period can be performed by various electronic devices, but it is not limited thereby.

Figure 17:
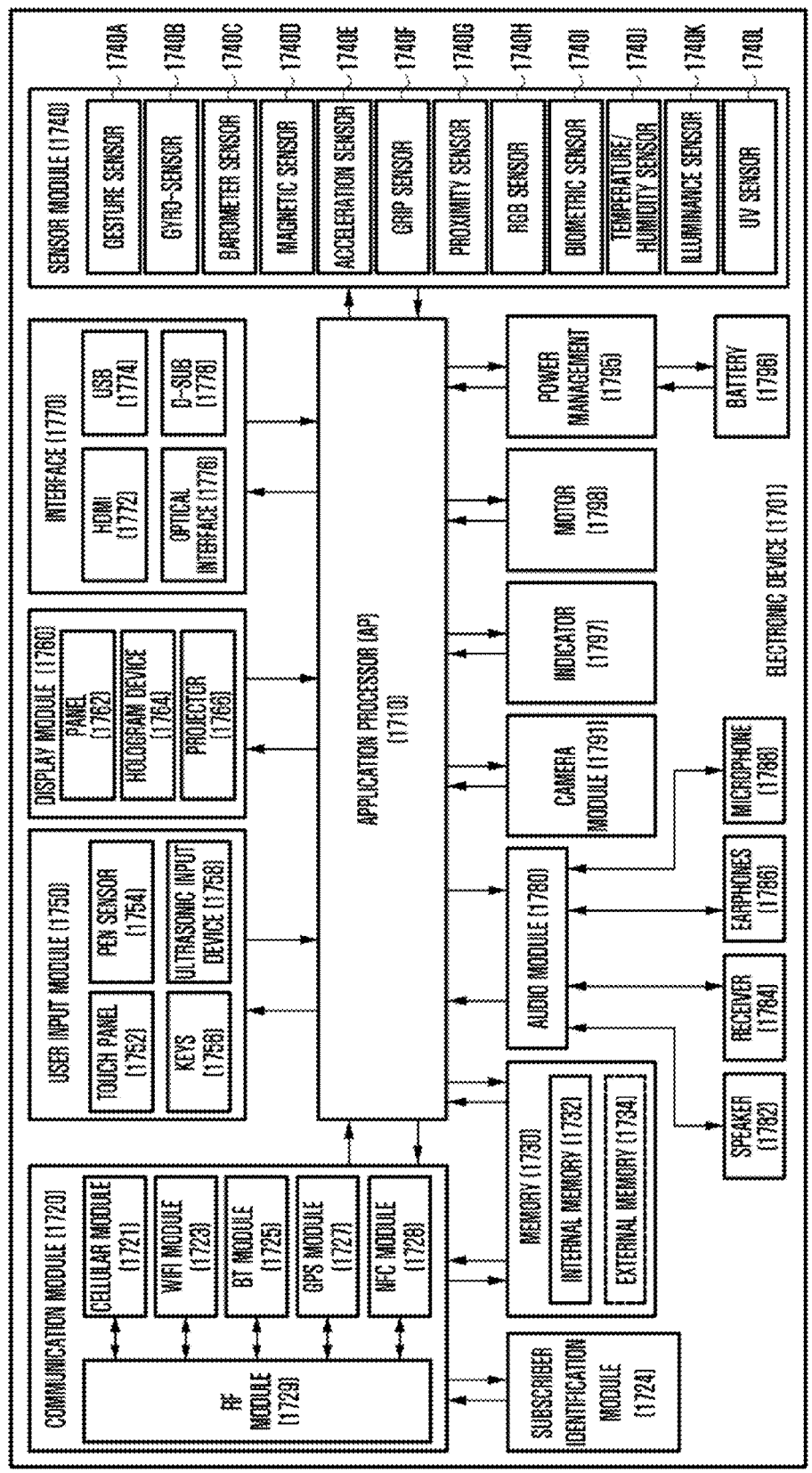
FIG. 17 is a block diagram illustrating a configuration of an electronic device according to various embodiments of the present disclosure.

FIG. 17 is a block diagram illustrating an electronic device 1701 in accordance with an embodiment of the present disclosure. The electronic device 1701 may form, for example, the whole or part of the electronic device 101 shown in FIG. 1.

Referring to FIG. 17, the electronic device 1701 may include at least one application processor (AP) 1710, a communication module 1720, a subscriber identification module (SIM) card 1724, a memory 1730, a sensor module 1740, an input unit 1750, a display 1760, an interface 1770, an audio module 1780, a camera module 1791, a power management module 1795, a battery 1796, an indicator 1797, and a motor 1798.

The AP 1710 may drive an operating system (OS) or applications, control a plurality of hardware or software components connected thereto, and also perform processing and operation for various data including multimedia data. The AP 1710 may be formed of system-on-chip (SoC), for example. According to an embodiment, the AP 1710 may further include a graphic processing unit (GPU) (not shown).

The communication module 1720 (e.g., the communication interface 170) may perform a data communication with any other electronic device (e.g., the electronic device 104 or the server 106, shown in FIG. 1) connected to the electronic device 1701 (e.g., the electronic device 101 shown in FIG. 1) through the network. According to an embodiment, the communication module 1720 may include therein a cellular module 1721, a Wi-Fi (WIFI) module 1723, a BT module 1725, a GPS (or GNSS) module 1727, an NFC module 1728, and a radio frequency (RF) module 1729.

The cellular module 1721 may offer a voice call, a video call, a message service, an internet service, or the like through a communication network (e.g., LTE, LTE-A, CDMA, WCDMA, UMTS, WiBro, or GSM, etc.). Additionally, the cellular module 1721 may perform identification and authentication of the electronic device in the communication network, using the SIM card 1724. According to an embodiment, the cellular module 1721 may perform at least part of functions the AP 1710 can provide. For example, the cellular module 1721 may perform at least part of a multimedia control function.

According to an embodiment, the cellular module 1721 may include a communication processor (CP). Additionally, the cellular module 1721 may be formed of SoC, for example. Although some elements such as the cellular module 1721 (e.g., the CP), the memory 1730, or the power management module 1795 are shown as separate elements being different from the AP 1710 in FIG. 17, the AP 1710 may be formed to have at least part (e.g., the cellular module 1721) of the above elements in an embodiment.

According to an embodiment, the AP 1710 or the cellular module 1721 (e.g., the CP) may load commands or data, received from a nonvolatile memory connected thereto or from at least one of the other elements, into a volatile memory to process them. Additionally, the AP 1710 or the cellular module 1721 may store data, received from or created at one or more of the other elements, in the nonvolatile memory.

Each of the Wi-Fi module 1723, the BT module 1725, the GPS (or GNSS) module 1727 and the NFC module 1728 may include a processor for processing data transmitted or received therethrough. Although FIG. 17 shows the cellular module 1721, the Wi-Fi module 223, the BT module 225, the GPS (or GNSS) module 227 and the NFC module 1728 as different blocks, at least part of them may be contained in a single IC (Integrated Circuit) chip or a single IC package in an embodiment. For example, at least part (e.g., the CP corresponding to the cellular module 1721 and a Wi-Fi processor corresponding to the Wi-Fi module 1723) of respective processors corresponding to the cellular module 1721, the Wi-Fi module 1723, the BT module 1725, the GPS (or GNSS) module 1727 and the NFC module 1728 may be formed as a single SoC.

The RF module 1729 may transmit and receive data, e.g., RF signals or any other electric signals. Although not shown, the RF module 1729 may include a transceiver, a power amp module (PAM), a frequency filter, a low noise amplifier (LNA), or the like. Also, the RF module 1729 may include another component, e.g., a wire or a conductor, for transmission of electromagnetic waves in a free air space. Although FIG. 17 shows that the cellular module 1721, the Wi-Fi module 1723, the BT module 1725, the GPS module 1727 and the NFC module 1728 share the RF module 1729, at least one of them may perform transmission and reception of RF signals through a separate RF module in an embodiment.

In one embodiment of the present disclosure, the communication module 1720 may be connected to the application processor (AP). At least one of the cellular module 1721, Wi-Fi module 1723, BT module 1725, GNSS module 1727, and NFC module 1728 may directly send and receive a signal to and from the AP.

In one embodiment, the GNSS module 1727 may be a module that has a location identification function enabling determination of the location of the electronic device 101. Hence, The GNSS module 1727 may include one or more components to carry out the location identification function in addition to the components described herein.

In one embodiment, the GNSS module 1727 may include a controller for controlling components of the GNSS module 1727 to carry out the GNSS related function. For example, the GNSS module 1727 may include a GNSS engine (e.g. GPS engine). The GNSS module 1727 may include a communication processor (CP), and the GNSS engine may be included in the CP. In various embodiments, the GNSS module 1727 may be implemented using a GNSS chipset (e.g. GPS chipset). The GNSS module 1727, GNSS engine, controller in the GNSS module 1727, GNSS chipset, and CP may be configured as separate entities with different functions or configured as a single entity, if desired.

In various embodiments, the GNSS module 1727 may receive information from one or more artificial satellites and forward the received information to the processor 120, the AP 1710, or the CP 1720. The GNSS module 1727 may directly identify the location of the electronic device 101 on the basis of the received satellite information. In this case, the GNSS module 1727 may send information associated with the identified location to the processor 120, the AP 1710, or the CP 1720.

In various embodiments, when at least a part of the GNSS module 1727 (e.g. GNSS RF receiver) is turned off, the electronic device 1701 may identify the location by use of the communication module 1720. When the GNSS RF receiver (not shown) is turned off, if there is a need to identify the location of the electronic device 1701, the processor 1710 (e.g., the processor 120 shown in FIG. 1) may identify the location on the basis of the communication module 1720 including the cellular module 1721 and Wi-Fi module 1723.

The SIM card 1724 may be a specific card formed of SIM and may be inserted into a slot formed at a certain place of the electronic device. The SIM card 1724 may contain therein an integrated circuit card identifier (ICCID) or an international mobile subscriber identity (IMSI).

The memory 1730 (e.g., the memory 130 shown in FIG. 1) may include an internal memory 1732 and an external memory 1734. The internal memory 1732 may include, for example, at least one of a volatile memory (e.g., dynamic random access memory (DRAM), static RAM (SRAM), synchronous DRAM (SDRAM), etc.) or a nonvolatile memory (e.g., one-time programmable read-only memory (OTPROM), programmable ROM (PROM), erasable and programmable ROM (EPROM), electrically erasable and programmable ROM (EEPROM), mask ROM, flash ROM, NAND flash memory, NOR flash memory, etc.).

In various embodiments, the memory 1730 (e.g., the memory 130) may store at least one of programs, algorithms, routines, and instructions needed for controlling the GNSS module 1727. The memory 1730 may store instructions needed for carrying out the functions described herein under the control of the processor 1710 (e.g., the processor 120).

According to an embodiment, the internal memory 1732 may have the form of a solid state drive (SSD). The external memory 1734 may include a flash drive, e.g., compact flash (CF), secure digital (SD), micro-SD, mini-SD, extreme digital (xD), memory stick, or the like. The external memory 1734 may be functionally connected to the electronic device 1701 through various interfaces. According to an embodiment, the electronic device 1701 may further include a storage device or medium such as a hard drive.

The sensor module 1740 may measure physical quantity or sense an operating status of the electronic device 1701, and then convert measured or sensed information into electric signals. The sensor module 1740 may include, for example, at least one of a gesture sensor 1740A, a gyro sensor 1740B, an atmospheric (e.g., barometric or barometer) sensor 1740C, a magnetic sensor 1740D, an acceleration sensor 1740E, a grip sensor 1740F, a proximity sensor 1740G, a color sensor 1740H (e.g., red, green, blue (RGB) sensor), a biometric sensor 1740I, a temperature-humidity sensor 1740J, an illumination or illuminance sensor 1740K, and a ultraviolet (UV) sensor 1740M. Additionally or alternatively, the sensor module 1740 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 1740 may include a control circuit for controlling one or more sensors equipped therein.

The input unit or module 1750 may include a touch panel 1752, a digital pen sensor 1754, a key 1756, or an ultrasonic input unit 1758. The touch panel 1752 may recognize a touch input in a manner of capacitive type, resistive type, infrared type, or ultrasonic type. Also, the touch panel 1752 may further include a control circuit. In case of a capacitive type, a physical contact or proximity may be recognized. The touch panel 1752 may further include a tactile layer. In this case, the touch panel 1752 may offer a tactile feedback to a user.

The digital pen sensor 1754 may be formed in the same or similar manner as receiving a touch input or by using a separate recognition sheet. The key 1756 may include, for example, a physical button, an optical key, or a keypad. The ultrasonic input unit 1758 is a specific device capable of identifying data by sensing sound waves with a microphone 1788 in the electronic device 1701 through an input tool that generates ultrasonic signals, thus allowing wireless recognition. According to an embodiment, the electronic device 1701 may receive a user input from any external device (e.g., a computer or a server) connected thereto through the communication module 1720.

The display module 1760 (e.g., the display module 160 shown in FIG. 1) may include a panel 1762, a hologram 1764, or a projector 1766. The panel 262 may be, for example, LCD, active matrix OLED (AM OLED), or the like. The panel 262 may have a flexible, transparent or wearable form. The panel 1762 may be formed of a single module with the touch panel 252. The hologram 1764 may show a stereoscopic image in the air using interference of light. The projector 1766 may project an image onto a screen, which may be located at the inside or outside of the electronic device 200. According to an embodiment, the display 1760 may further include a control circuit for controlling the panel 1762, the hologram 1764, and the projector 1766.

The interface 1770 may include, for example, high-definition multimedia interface (HDMI) 1772, a universal serial bus (USB) 1774, an optical interface 1776, or a D-subminiature (D-sub) 1778. The interface 1770 may be contained, for example, in the communication interface 170 shown in FIG. 1. Additionally or alternatively, the interface 1770 may include, for example, an mobile high-definition link (MHL) interface, an SD card/multi-media card (MMC) interface, or an infrared data association (IrDA) interface.

The audio module 1780 may perform a conversion between sounds and electric signals. At least part of the audio module 1780 may be contained, for example, in the input/output interface 150 shown in FIG. 1. The audio module 1780 may process sound information inputted or outputted through a speaker 1782, a receiver 1784, an earphone 1786, or a microphone 1788.

The camera module 1791 is a device capable of obtaining still images and moving images. According to an embodiment, the camera module 1791 may include at least one image sensor (e.g., a front sensor or a rear sensor), a lens (not shown), an image signal processor (ISP, not shown), or a flash (e.g., LED or xenon lamp, not shown).

The power management module 1795 may manage electric power of the electronic device 1701. Although not shown, the power management module 1795 may include, for example, a power management integrated circuit (PMIC), a charger IC, or a battery or fuel gauge.

The PMIC may be formed, for example, of an IC chip or SoC. Charging may be performed in a wired or wireless manner. The charger IC may charge a battery 1796 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1796 and a voltage, current or temperature in a charging process. The battery 1796 may store or create electric power therein and supply electric power to the electronic device 1701. The battery 1796 may be, for example, a rechargeable battery or a solar battery.

The indicator 1797 may show thereon a current status (e.g., a booting status, a message status, or a recharging status) of the electronic device 1701 or of its part (e.g., the AP 1710). The motor 1798 may convert an electric signal into a mechanical vibration. Although not shown, the electronic device 1701 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Figure 18:
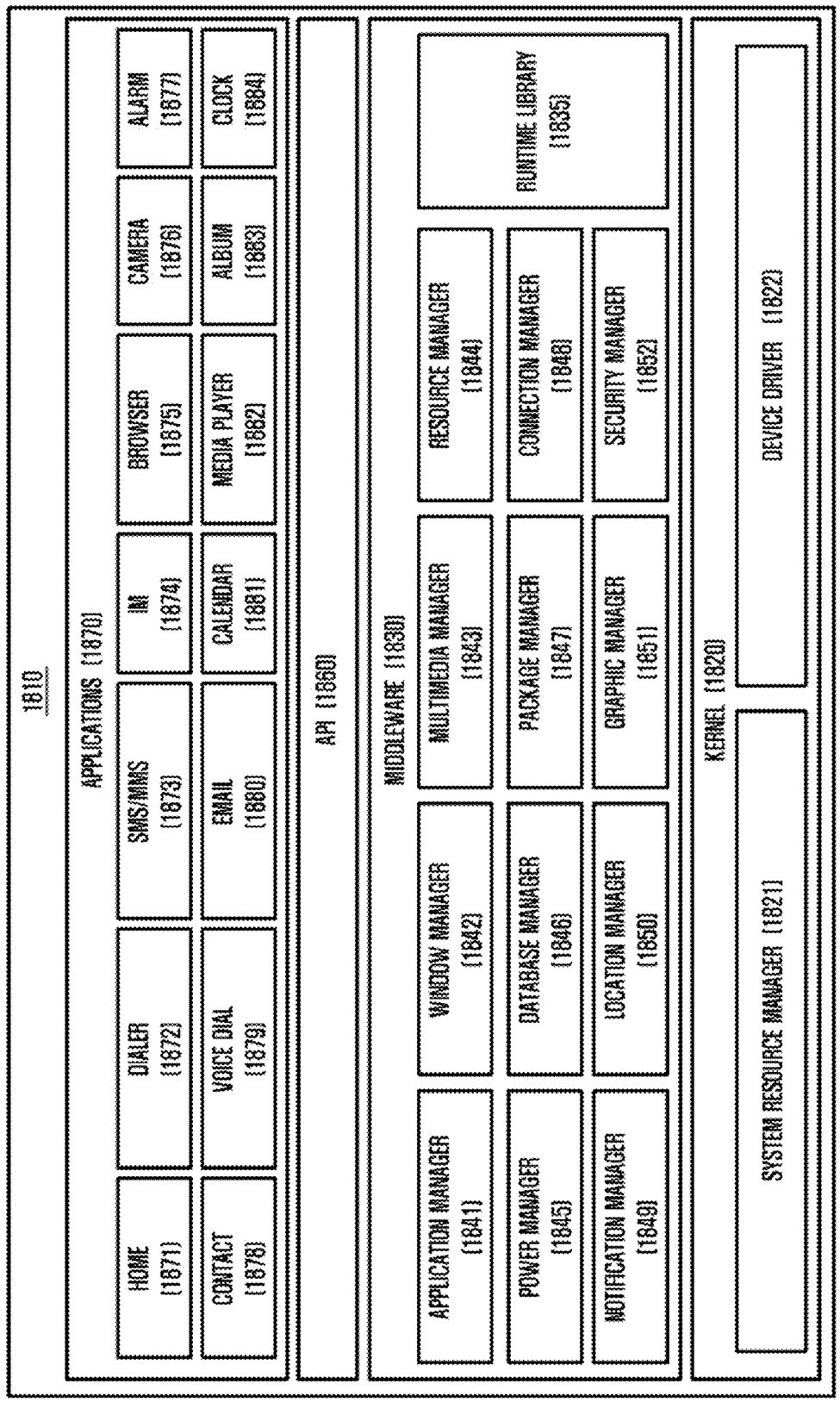
FIG. 18 is a block diagram illustrating a configuration of a program module of an electronic device according to various embodiments of the present disclosure.

FIG. 18 is a block diagram illustrating a configuration of a programming module 1800 according to an embodiment of the present disclosure.

The programming module 1800 may be included (or stored) in the electronic device 101 (e.g., the memory 130) or may be included (or stored) in the electronic device 100 (e.g., the memory 1730) illustrated in FIG. 1. At least a part of the programming module 1810 may be implemented in software, firmware, hardware, or a combination of two or more thereof. The programming module 1810 may be implemented in hardware (e.g., the electronic device 200), and may include an OS controlling resources related to an electronic device (e.g., the electronic device 101) and/or various applications (e.g., an application 370) executed in the OS. For example, the OS may be Android™, iOS™, Windows™, Symbian®, Tizen®, Bala®, and the like.

Referring to FIG. 18, the programming module 1810 may include a kernel 1820, a middleware 1830, an API 1860, and/or the application 1870.

The kernel 1820 (e.g., the kernel 141 shown in FIG. 1) may include a system resource manager 1821 and/or a device driver 1822. The system resource manager 1821 may include, for example, a process manager (not illustrated), a memory manager (not illustrated), and a file system manager (not illustrated). The system resource manager 1821 may perform the control, allocation, recovery, and/or the like of system resources. The device driver 1822 may include, for example, a display driver (not illustrated), a camera driver (not illustrated), a Bluetooth (BT) driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 1822 may include an inter-process communication (IPC) driver (not illustrated).

The middleware 1830 may include multiple modules previously implemented so as to provide a function used in common by the applications 1870. Also, the middleware 1830 may provide a function to the applications 1870 through the API 1860 in order to enable the applications 1870 to efficiently use limited system resources within the electronic device. For example, as illustrated in FIG. 18, the middleware 1830 (e.g., the middleware 143 shown in FIG. 1) may include at least one of a runtime library 1835, an application manager 1841, a window manager 1842, a multimedia manager 1843, a resource manager 1844, a power manager 1845, a database manager 1846, a package manager 1847, a connectivity or connection manager 1848, a notification manager 1849, a location manager 1850, a graphic manager 1851, a security manager 1852, and any other suitable and/or similar manager.

The runtime library 1835 may include, for example, a library module used by a complier, in order to add a new function by using a programming language during the execution of the application 1870. According to an embodiment of the present disclosure, the runtime library 1835 may perform functions which are related to input and output, the management of a memory, an arithmetic function, and/or the like.

The application manager 1841 may manage, for example, a life cycle of at least one of the applications 1870. The window manager 1842 may manage GUI resources used on the screen. The multimedia manager 1843 may detect a format used to reproduce various media files and may encode or decode a media file through a codec appropriate for the relevant format. The resource manager 1844 may manage resources, such as a source code, a memory, a storage space, and/or the like of at least one of the applications 1870.

The power manager 1845 may operate together with a basic input/output system (BIOS), may manage a battery or power, and may provide power information and the like used for an operation. The database manager 1846 may manage a database in such a manner as to enable the generation, search and/or change of the database to be used by at least one of the applications 1870. The package manager 1847 may manage the installation and/or update of an application distributed in the form of a package file.

The connectivity manager 1848 may manage a wireless connectivity such as, for example, Wi-Fi and Bluetooth. The notification manager 1849 may display or report, to the user, an event such as an arrival message, an appointment, a proximity alarm, and the like in such a manner as not to disturb the user. The location manager 1850 may manage location information of the electronic device. The graphic manager 1851 may manage a graphic effect, which is to be provided to the user, and/or a user interface related to the graphic effect. The security manager 1852 may provide various security functions used for system security, user authentication, and the like. According to an embodiment of the present disclosure, when the electronic device (e.g., the electronic device 101 shown in FIG. 1) has a telephone function, the middleware 1830 may further include a telephony manager (not illustrated) for managing a voice telephony call function and/or a video telephony call function of the electronic device.

The middleware 1830 may generate and use a new middleware module through various functional combinations of the above-described internal element modules. The middleware 1830 may provide modules specialized according to types of OSs in order to provide differentiated functions. Also, the middleware 1830 may dynamically delete some of the existing elements, or may add new elements. Accordingly, the middleware 1830 may omit some of the elements described in the various embodiments of the present disclosure, may further include other elements, or may replace the some of the elements with elements, each of which performs a similar function and has a different name.

The API 1860 (e.g., the API 1710 shown in FIG. 17) is a set of API programming functions, and may be provided with a different configuration according to an OS. In the case of Android™ or iOS™, for example, one API set may be provided to each platform. In the case of Tizen®, for example, two or more API sets may be provided to each platform.

The applications 1870 (e.g., the applications 147 in FIG. 1) may include, for example, a preloaded application and/or a third party application. The applications 1870 may include, for example, a home application 1871, a dialer application 1872, a short message service (SMS)/multimedia message service (MMS) application 1873, an instant message (IM) application 1874, a browser application 1875, a camera application 1876, an alarm application 1877, a contact application 1878, a voice dial application 1879, an electronic mail (e-mail) application 1880, a calendar application 1881, a media player application 1882, an album application 1883, a clock application 1884, and any other suitable and/or similar application.

At least a part of the programming module 1810 may be implemented by instructions stored in a non-transitory computer-readable storage medium. When the instructions are executed by one or more processors (e.g., the one or more APs 1710), the one or more processors may perform functions corresponding to the instructions. The non-transitory computer-readable storage medium may be, for example, the memory 1730. At least a part of the programming module 1810 may be implemented (e.g., executed) by, for example, the one or more processors 1710. At least a part of the programming module 1810 may include, for example, a module, a program, a routine, a set of instructions, and/or a process for performing one or more functions.

Names of the elements of the programming module (e.g., the programming module 1810) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

As described above, the speech recognition device and method of the present disclosure is advantageous in terms of improving speech recognition accuracy by adjusting the utterance end detection period dynamically in adaptation to user's utterance pattern.

The above-discussed method is described herein with reference to flowchart illustrations of user interfaces, methods, and computer program products according to various embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
  a microphone;
  a display;
  at least one processor electrically connected to the microphone and the display; and
  a memory electrically connected to the at least one processor,
  wherein the memory stores commands, executable by the at least one processor, for:
    recognizing speech that is input through the microphone,
    identifying a speech stop time point at which a magnitude of the speech is less than a predetermined value and a speech resume time point at which the magnitude of the speech exceeds the predetermined value,
    identifying a length of a pause period, which comes after the speech, between the speech stop time point and the speech resume time point,
    updating a length of a predetermined speech end detection period to the length of the pause period, and
    in response to determining that the speech resumes, determining whether the speech is ended based on the updated length of the predetermined speech end detection period, and
  wherein the memory further stores commands, executable by the at least one processor, for:
    controlling the display, when the speech is converted to text, to display the text corresponding to the speech formed as a series of words or phrases having spaces therebetween,
    receiving a user input for updating the length of the predetermined speech end detection period, the user input being received on the space included in the displayed text,
    identifying the length of the pause period corresponding to the space, and
    updating the length of the predetermined speech end detection period to the length of the pause period.

2. The electronic device of claim 1, wherein the commands comprise a command for packing the speech, the recognized speech input, and the pause period into a package and storing the package.

3. The electronic device of claim 1, wherein the commands comprise a command for the at least one processor to communicate with an external electronic device for speech recognition.

4. The electronic device of claim 1, wherein the commands comprise a command for controlling the display to display an indicator indicating that the speech ends at one of the spaces along with the text.

5. The electronic device of claim 1, wherein the user input is a command for selecting the series of words or phrases or the spaces to split or merge the series of words or phrases.

6. The electronic device of claim 5, wherein the commands comprise a command for updating, when splitting the series of words or phrases, the length of the predetermined speech end detection period to at least one pause period of pause periods following the series of words or phrases.

7. The electronic device of claim 5, wherein the commands comprise a command for updating, when merging the series of words or phrases, the length of the predetermined speech end detection period to a longest pause period of pause periods following the series of words or phrases merged.

8. A method of speech recognition of an electronic device, the method comprising:
    recognizing speech that is input;
    identifying a speech stop time point at which a magnitude of the speech is less than a predetermined value and a speech resume time point at which the magnitude of the speech exceeds the predetermined value;
    identifying a length of a pause period, which comes after the speech, between the speech stop time point and the speech resume time point;
    updating a length of a predetermined speech end detection period to the length of the pause period; and
    in response to determining that the speech resumes, determining whether the speech is ended based on the updated length of the predetermined speech end detection period,
    wherein the method further comprises:
        controlling the display, when the speech is converted to text, to display the text corresponding to the speech formed as a series of words or phrases having spaces therebetween,
        receiving a user input for updating the length of the predetermined speech end detection period, the user input being received on the space included in the displayed text,
        identifying the length of the pause period corresponding to the space, and
        updating the length of the predetermined speech end detection period to the length of the pause period.

9. The method of claim 8, wherein the updating of the length of the predetermined speech end detection period comprises:
    packing the speech, the recognized speech input, and the pause period into a package; and
    storing the package.

10. The method of claim 8, wherein the updating of the length of the predetermined speech end detection period comprises determining, when the speech resumes after the length of the predetermined speech end detection period is updated to the length of the pause period, whether the speech ends in the updated length of the predetermined speech end detection period.

11. The method of claim 8, wherein the user input comprises a command for:
    selecting the series of words or phrases or the spaces, and
    splitting or merging the selected series of words or phrases.

12. The method of claim 11, wherein the splitting of the selected series of words or phrases comprises updating the length of the predetermined speech end detection period to a length of at least one pause period of pause periods following the series of words or phrases.

13. The method of claim 11, wherein the merging of the selected series of words or phrases comprises updating the length of the predetermined speech end detection period to a length of a longest pause period of pause periods following the merger of the series of words or phrases.

14. A non-transitory computer-readable recording medium having recorded thereon at least one program comprising commands, which when executed by at least one processor, performs a speech recognition method, the method comprising:
    recognizing speech that is input;
    identifying a speech stop time point, which comes after the speech, at which a magnitude of the speech is less than a predetermined value and a speech resume time point at which the magnitude of the speech exceeds the predetermined value;
    identifying a length of a pause period between the speech stop time point and the speech resume time point;
    updating a length of a predetermined speech end detection period to the length of the pause period; and
    in response to determining that the speech resumes, determining whether the speech is ended based on the updated length of the predetermined speech end detection period,
    wherein the method further comprises:
        controlling a display, when the speech is converted to text, to display the text corresponding to the speech formed as a series of words or phrases having spaces therebetween,
        receiving a user input for updating the length of the predetermined speech end detection period, the user input being received on the space included in the displayed text,
        identifying the length of the pause period corresponding to the space, and
        updating the length of the predetermined speech end detection period to the length of the pause period.

* * * * *